US011825493B2

(12) United States Patent
Hu et al.

(10) Patent No.: US 11,825,493 B2
(45) Date of Patent: Nov. 21, 2023

(54) RESOURCE UNIT ALLOCATION SUBFIELD DESIGNS FOR TRIGGER-BASED AND SELF-CONTAINED SIGNALING IN EXTREME HIGH-THROUGHPUT SYSTEMS

(71) Applicant: MediaTek Singapore Pte. Ltd., Singapore (SG)

(72) Inventors: Shengquan Hu, San Jose, CA (US); Jianhan Liu, San Jose, CA (US); Thomas Edward Pare, Jr., San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 59 days.

(21) Appl. No.: 17/225,474

(22) Filed: Apr. 8, 2021

(65) Prior Publication Data

US 2021/0329628 A1 Oct. 21, 2021

Related U.S. Application Data

(60) Provisional application No. 63/011,321, filed on Apr. 17, 2020.

(51) Int. Cl.

| | |
|---|---|
| ***H04W 72/04*** | (2023.01) |
| ***H04W 72/12*** | (2023.01) |
| ***H04W 28/06*** | (2009.01) |
| ***H04W 72/27*** | (2023.01) |
| ***H04W 72/0453*** | (2023.01) |
| ***H04W 72/20*** | (2023.01) |
| ***H04W 72/51*** | (2023.01) |

(52) U.S. Cl.

CPC ....... *H04W 72/27* (2023.01); *H04W 72/0453* (2013.01); *H04W 72/20* (2023.01); *H04W 72/51* (2023.01)

(58) Field of Classification Search

None

See application file for complete search history.

(56) References Cited

U.S. PATENT DOCUMENTS

| | | | | |
|---|---|---|---|---|
| 2020/0015219 | A1* | 1/2020 | Asterjadhi | H04W 28/20 |
| 2020/0136884 | A1* | 4/2020 | Park | H04L 27/2665 |
| 2020/0329444 | A1* | 10/2020 | Cao | H04W 72/044 |
| 2020/0396742 | A1* | 12/2020 | Park | H04L 65/40 |

(Continued)

FOREIGN PATENT DOCUMENTS

| | | |
|---|---|---|
| CN | 108370302 A | 8/2018 |
| CN | 110198209 A | 9/2019 |

(Continued)

OTHER PUBLICATIONS

China National Intellectual Property Administration, First Office Action in China Patent Application No. 202110412649.4, dated Jun. 26, 2023.

*Primary Examiner* — Sai Aung

(74) *Attorney, Agent, or Firm* — Han IP PLLC; Andy M. Han

(57) ABSTRACT

A method pertaining to resource unit (RU) allocation subfield designs for trigger-based and self-contained signaling in extreme high-throughput (EHT) systems involves receiving a signaling and determining allocation of one or more RUs according to a 9-bit RU allocation subfield indicated in the signaling. The method also involves performing wireless communications using the one or more RUs.

24 Claims, 19 Drawing Sheets

(56) References Cited

U.S. PATENT DOCUMENTS

| | | | | |
|---|---|---|---|---|
| 2020/0396743 | A1* | 12/2020 | Park | H04L 1/1614 |
| 2021/0028917 | A1* | 1/2021 | Park | H04L 27/26 |
| 2021/0135792 | A1* | 5/2021 | Cho | H04L 1/1887 |
| 2021/0204204 | A1* | 7/2021 | Kim | H04W 48/10 |
| 2023/0038358 | A1* | 2/2023 | Dong | H04W 72/0453 |

FOREIGN PATENT DOCUMENTS

| | | | |
|---|---|---|---|
| CN | 110730050 | A | 1/2020 |
| CN | 110768757 | A | 2/2020 |
| WO | WO 2019161771 | A1 | 8/2019 |

* cited by examiner

200

| RU SIZE | BW20 | BW40 | BW80 | BW160 | BW320 |
|---|---|---|---|---|---|
| 26 | 9 | 18 | 36 | 72 | 144 |
| 52 | 4 | 8 | 16 | 32 | 64 |
| 78 (26 + 52) | 3 | 6 | 4 | 8 | 16 |
| 106 | 2 | 4 | 8 | 16 | 32 |
| 132 (26 + 106) | 2 | 4 | 4 | 8 | 16 |
| 242 | 1 | 2 | 4 | 8 | 16 |
| 484 | N/A | 1 | 2 | 4 | 8 |
| 726 (242 + 484) | N/A | N/A | 4 | 8 | 16 |
| 996 | N/A | N/A | 1 | 2 | 4 |
| 1480 (484 + 996) | N/A | N/A | N/A | 4 | 8 |
| 1722 (242 + 484 + 996) | N/A | N/A | N/A | 8 | 16 |
| 2 x 996 | N/A | N/A | N/A | 1 | 2 |
| 484 + 2 x 996 | N/A | N/A | N/A | N/A | 12 |
| 3 x 996 | N/A | N/A | N/A | N/A | 4 |
| 484 + 3 x 996 | N/A | N/A | N/A | N/A | 8 |
| 4 x 996 | N/A | N/A | N/A | N/A | 1 |

| RU Allocation Subfield | | BW Subfield (in MHz) | RU Size |
|---|---|---|---|
| B8 ~ B2 | B1B0 | | |
| 0 ~ 36 | 0, 1, 2, 3 | 20, 40, 80, 160, 80+80, 240, 160+80, 320, 160+160 | 26 |
| 37 ~ 52 | | 20, 40, 80, 160, 80+80, 240, 160+80, 320, 160+160 | 52 |
| 53 ~ 60 | | 20, 40, 80, 160, 80+80, 240, 160+80, 320, 160+160 | 106 |
| 61 ~ 64 | | 20, 40, 80, 160, 80+80, 240, 160+80, 320, 160+160 | 242 |
| 65, 66 | | 40, 80, 160, 80+80, 240, 160+80, 320, 160+160 | 484 |
| 67 | | 80, 160, 80+80, 240, 160+80, 320, 160+160 | 996 |
| 68 | 1, 2, 3 | 160, 80+80, 240, 160+80, 320, 160+160 | 2 X 996 (CONTINUOUS) |
| 69 ~ 74 | 0, 1, 2, 3 | 20, 40, 80, 160, 80+80, 240, 160+80, 320, 160+160 | 78 (26 + 52) |
| 75 ~ 82 | | 20, 40, 80, 160, 80+80, 240, 160+80, 320, 160+160 | 132 (26 + 106) |
| 83 ~ 86 | | 80, 160, 80+80, 240, 160+80, 320, 160+160 | 726 (242 + 484) |
| 87 ~ 90 | 1, 2, 3 | 160, 80+80, 240, 160+80, 320, 160+160 | (484 + 996) |
| 91 ~ 98 | | 160, 80+80, 240, 160+80, 320, 160+160 | (242 + 484) + 996 |
| 99 ~ 100 | 2 | 240, 160+80 | 2 X 996 (NON-CONTINUOUS) |
| 101 ~ 106 | 2 | 240, 160+80 | 484 + 2 * 996 |
| 107 | 2, 3 | 240, 320, 160+160 | 3 * 996 (CONTINUOUS) |
| 108 ~ 110 | 3 | 320, 160+160 | 3 * 996 |
| 111 ~ 118 | 3 | 320, 160+160 | 484 + 3 * 996 |
| 119 | 3 | 320, 160+160 | 4 * 996 |

EXACTLY SAME AS IEEE 802.11AX

AGGREGATED MULTIPLE-RU FOR IEEE 802.11BE

FIG. 4

ONE OPTION OF "B8 ~ B2" BIT ASSIGNMENTS FOR AGGREGATED MRU(242 + 484)

(A)

| 242 | 484 | B8 ~ B2 = 1010011 = 83 |
| 242 | 484 | B8 ~ B2 = 1010100 = 84 |
| 484 | 242 | B8 ~ B2 = 1010101 = 85 |
| 484 | 242 | B8 ~ B2 = 1010110 = 86 |

ANOTHER OPTION OF "B8 ~ B2" BIT ASSIGNMENTS FOR AGGREGATED MRU(242 + 484)

(B)

| 242 | 484 | B8 ~ B2 = 1010110 = 86 |
| 242 | 484 | B8 ~ B2 = 1010101 = 85 |
| 484 | 242 | B8 ~ B2 = 1010100 = 84 |
| 484 | 242 | B8 ~ B2 = 1010011 = 83 |

1000

(A) ONE OPTION OF "B8 ~ B2" BIT ASSIGNMENTS FOR AGGREGATED MRU(2 × 996)

| 996 | 996 | | | B8 ~ B2 = 1000101 = 69 |
| 996 | 996 | | | B8 ~ B2 = 1100011 = 99 |
| 996 | 996 | | | B8 ~ B2 = 1100100 = 100 (MAY NOT BE NEEDED) |

(B) ONE OPTION OF "B8 ~ B2" BIT ASSIGNMENTS FOR AGGREGATED MRU(484 + 2 × 996)

1100

(A) ONE OPTION OF "B8 ~ B2" BIT ASSIGNMENTS FOR AGGREGATED MRU(3 × 996)

B8 ~ B2 = 1101011 = 107
B8 ~ B2 = 1101100 = 108
B8 ~ B2 = 1101101 = 109
B8 ~ B2 = 1101110 = 110 ← THIS ENTRY MAY NOT BE NEEDED AND, THUS, THE INDEX AFTER THIS ENTRY MAY BE RE-LABELED ACCORDINGLY

(B) ANOTHER OPTION OF "B8 ~ B2" BIT ASSIGNMENTS FOR AGGREGATED MRU(484 + 3 × 996)

1400

| RU Allocation Subfield | | BW Subfield (in MHz) | RU Size |
|---|---|---|---|
| B8 ~ B2 | B1B0 | | |
| 0 ~ 36 | 0, 1, 2, 3 | 20, 40, 80, 160, 80+80, 240, 160+80, 320, 160+160 | 26 |
| 37 ~ 52 | | 20, 40, 80, 160, 80+80, 240, 160+80, 320, 160+160 | 52 |
| 53 ~ 60 | | 20, 40, 80, 160, 80+80, 240, 160+80, 320, 160+160 | 106 |
| 61 ~ 64 | | 20, 40, 80, 160, 80+80, 240, 160+80, 320, 160+160 | 242 |
| 65, 66 | | 40, 80, 160, 80+80, 240, 160+80, 320, 160+160 | 484 |
| 67 | | 80, 160, 80+80, 240, 160+80, 320, 160+160 | 996 |
| 68 ~ 73 | | 20, 40, 80, 160, 80+80, 240, 160+80, 320, 160+160 | 78 (26 + 52) |
| 74 ~ 81 | | 20, 40, 80, 160, 80+80, 240, 160+80, 320, 160+160 | 132 (26 + 106) |
| 82 ~ 85 | | 80, 160, 80+80, 240, 160+80, 320, 160+160 | 726 (242 + 484) |
| 86 ~ 89 | 1, 2, 3 | 160, 80+80, 240, 160+80, 320, 160+160 | (484 + 996) |
| 90 ~ 97 | | 160, 80+80, 240, 160+80, 320, 160+160 | (242 + 484) + 996 |
| 98 ~ 100 | | 160, 80+80, 240, 160+80, 320, 160+160 | 2 x 996 |
| 101 ~ 106 | 2 | 240, 160+80 | (484 + 2 x 996) |
| 107 | 2, 3 | 240, 320, 160+160 | 3 x 996 (continuous in first three 80-MHz segments) |
| 108 ~ 110 | 3 | 320, 160+160 | 3 x 996 (beyond 3RD 80-MHz segment) |
| 111 ~ 118 | 3 | 320, 160+160 | (484 + 3 x 996) |
| 119 | 3 | 320, 160+160 | 4 x 996 |

RU/MRU within one 80-MHz Segment (rows 0 ~ 36 through 82 ~ 85)

RU/MRU across 80-MHz Segment Boundary (rows 86 ~ 89 through 119)

| RU Allocation Subfield | | BW Subfield (in MHz) | RU Size | |
|---|---|---|---|---|
| B8 ~ B2 | B1B0 | | | |
| 0 ~ 36 | 0, 1, 2, 3 | 20, 40, 80, 160, 80+80, 240, 160+80, 320, 160+160 | 26 | RU/MRU within one 80-MHz Segment |
| 37 ~ 52 | | 20, 40, 80, 160, 80+80, 240, 160+80, 320, 160+160 | 52 | |
| 53 ~ 58 | | 20, 40, 80, 160, 80+80, 240, 160+80, 320, 160+160 | 78 (26 + 52) | |
| 59 ~ 66 | | 20, 40, 80, 160, 80+80, 240, 160+80, 320, 160+160 | 106 | |
| 67 ~ 74 | | 20, 40, 80, 160, 80+80, 240, 160+80, 320, 160+160 | 132 (26 + 106) | |
| 75 ~ 78 | | 20, 40, 80, 160, 80+80, 240, 160+80, 320, 160+160 | 242 | |
| 79, 80 | | 40, 80, 160, 80+80, 240, 160+80, 320, 160+160 | 484 | |
| 81 ~ 84 | | 80, 160, 80+80, 240, 160+80, 320, 160+160 | 726 (242 + 484) | |
| 85 | | 80, 160, 80+80, 240, 160+80, 320, 160+160 | 996 | |
| 86 ~ 89 | 1, 2, 3 | 160, 80+80, 240, 160+80, 320, 160+160 | (484 + 996) | RU/MRU across 80-MHz Segment Boundary |
| 90 ~ 97 | | 160, 80+80, 240, 160+80, 320, 160+160 | (242 + 484) + 996 | |
| 98 ~ 100 | | 160, 80+80, 240, 160+80, 320, 160+160 | 2 x 996 | |
| 101 ~ 106 | 2 | 240, 160+80 | (484 + 2 x 996) | |
| 107 | 2, 3 | 240, 320, 160+160 | 3 x 996 (continuous in first three 80-MHz segments) | |
| 108 ~ 110 | 3 | 320, 160+160 | 3 x 996 (beyond 3rd 80-MHz segment) | |
| 111 ~ 118 | 3 | 320, 160+160 | (484 + 3 x 996) | |
| 119 | 3 | 320, 160+160 | 4 x 996 | |

| RU Allocation Subfield | | BW Subfield (in MHz) | RU Size |
|---|---|---|---|
| B8 ~ B2 | B1B0 | | |
| ('0000000' ~ '0100100') 0 ~ 36 | 0, 1, 2, 3 | 20, 40, 80, 160, 80+80, 240, 160+80, 320, 160+160 | 26 |
| ('0100101' ~ '0110100') 37 ~ 52 | | 20, 40, 80, 160, 80+80, 240, 160+80, 320, 160+160 | 52 |
| ('0110101' ~ '0111010') 53 ~ 58 | | 20, 40, 80, 160, 80+80, 240, 160+80, 320, 160+160 | 78 (26 + 52) |
| ('0111011' ~ '0111111') 59 ~ 63 | | Reserved | Reserved |
| ('1000yyy') 64 ~ 71 | | 20, 40, 80, 160, 80+80, 240, 160+80, 320, 160+160 | 106 |
| ('1001yyy') 72 ~ 79 | | 20, 40, 80, 160, 80+80, 240, 160+80, 320, 160+160 | 132 (26 + 106) |
| ('10100xx') 80 ~ 83 | | 20, 40, 80, 160, 80+80, 240, 160+80, 320, 160+160 | 242 |
| ('1010100' ~ '1010101') 84 ~ 85 | | 40, 80, 160, 80+80, 240, 160+80, 320, 160+160 | 484 |
| ('1010110') 86 | | 80, 160, 80+80, 240, 160+80, 320, 160+160 | 996 |
| ('1010111') 87 | | Reserved | Reserved |
| ('10110xx') 88 ~ 91 | | 80, 160, 80+80, 240, 160+80, 320, 160+160 | 726 (242 + 484) |
| ('10111xx') 92 ~ 95 | 1, 2, 3 | 160, 80+80, 240, 160+80, 320, 160+160 | 484 + 996 |
| ('1100yyy') 96 ~ 103 | | 160, 80+80, 240, 160+80, 320, 160+160 | (242 + 484) + 996 |
| ('1101000' ~ '11011101') 104 ~ 109 | 2, 3 | 240, 160+80 | 484 + 2 x 996 |
| ('1101110' ~ '11011111') 110 ~ 111 | | Reserved | Reserved |
| ('1110yyy') 112 ~ 119 | 3 | 320, 160+160 | 484 + 3 x 996 |
| ('1111000' ~ '1111010') 120 ~ 122 | 1, 2, 3 | 160, 80+80, 240, 160+80, 320, 160+160 | 2 x 996 |
| ('1111011') 123 | | Reserved | Reserved |
| ('1111100' ~ '1111110') 124 ~ 126 | 3 | 320, 160+160 | 3 x 996 |
| ('1111111') 127 | 3 | 320, 160+160 | 4 x 996 |

FIG. 16

RESOURCE UNIT ALLOCATION SUBFIELD DESIGNS FOR TRIGGER-BASED AND SELF-CONTAINED SIGNALING IN EXTREME HIGH-THROUGHPUT SYSTEMS

CROSS REFERENCE TO RELATED PATENT APPLICATION

The present disclosure is part of a non-provisional patent application claiming the priority benefit of U.S. Provisional Patent Application No. 63/011,321, filed 17 Apr. 2020, the content of which being incorporated by reference in its entirety.

TECHNICAL FIELD

The present disclosure is generally related to wireless communications and, more particularly, to resource unit (RU) allocation subfield designs for trigger-based and self-contained signaling in extreme high-throughput (EHT) systems.

BACKGROUND

Unless otherwise indicated herein, approaches described in this section are not prior art to the claims listed below and are not admitted as prior art by inclusion in this section.

In next-generation wireless communications, such as wireless local area network (WLAN) EHT systems in accordance with the Institute of Electrical and Electronics Engineers (IEEE) 802.11be standard, transmission over an aggregation of multiple RUs (herein interchangeably referred to as “multi-RU”, “M-RU” and “MRU”) for a single user (e.g., user equipment (UE)) is allowed. In addition, the wider bandwidth of 320 MHz is also supported in EHT systems. Therefore, there is a need for a solution that extends RU allocation subfield design defined in IEEE 802.11ax to support RU allocation signaling for wider bandwidths and aggregated MRUs.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to RU allocation subfield designs for trigger-based and self-contained signaling in EHT systems. Under various proposed schemes in accordance with the present disclosure, one additional bit in the RU allocation subfield may be utilized to support RU allocation signaling for both wider bandwidths of 320 MHz aggregated MRUs. It is believed that the proposed RU allocation subfield designs may be used for self-contained type signaling for both uplink (UL) trigger frame based signaling and downlink (DL) EHT-SIG signaling.

In one aspect, a method may involve receiving a signaling and determining allocation of one or more RUs according to a total 9-bit RU allocation subfield indicated in the signaling.

The method may also involve performing wireless communications using the one or more RUs.

In another aspect, a method may involve receiving a trigger frame indicating a 9-bit RU allocation subfield. The method may also involve determining allocation of one or more RUs in a bandwidth up to a 320-MHz bandwidth according to the 9-bit RU allocation subfield in an RU allocation table which indicates single RUs of different sizes and a plurality of aggregations of multiple RUs. The method may further involve performing an UL transmission using the one or more RUs responsive to receiving the trigger frame.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, Bluetooth, ZigBee, 5th Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 2 is a diagram of a summary of RUs and aggregated MRUs as defined in IEEE 802.11be.

FIG. 4 is a diagram of an example design under a first proposed scheme in accordance with the present disclosure.

FIG. 14 is a diagram of an example design under a second proposed scheme in accordance with the present disclosure.

FIG. 15 is a diagram of an example design under a third proposed scheme in accordance with the present disclosure.

FIG. 16 is a diagram of an example design under a fourth proposed scheme in accordance with the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to RU allocation subfield designs for trigger-based and self-contained signaling in EHT systems. According to the present disclosure, a number of possible solutions may be implemented separately or jointly. That is, although these possible solutions may be described below separately, two or more of these possible solutions may be implemented in one combination or another.

Figure 1:
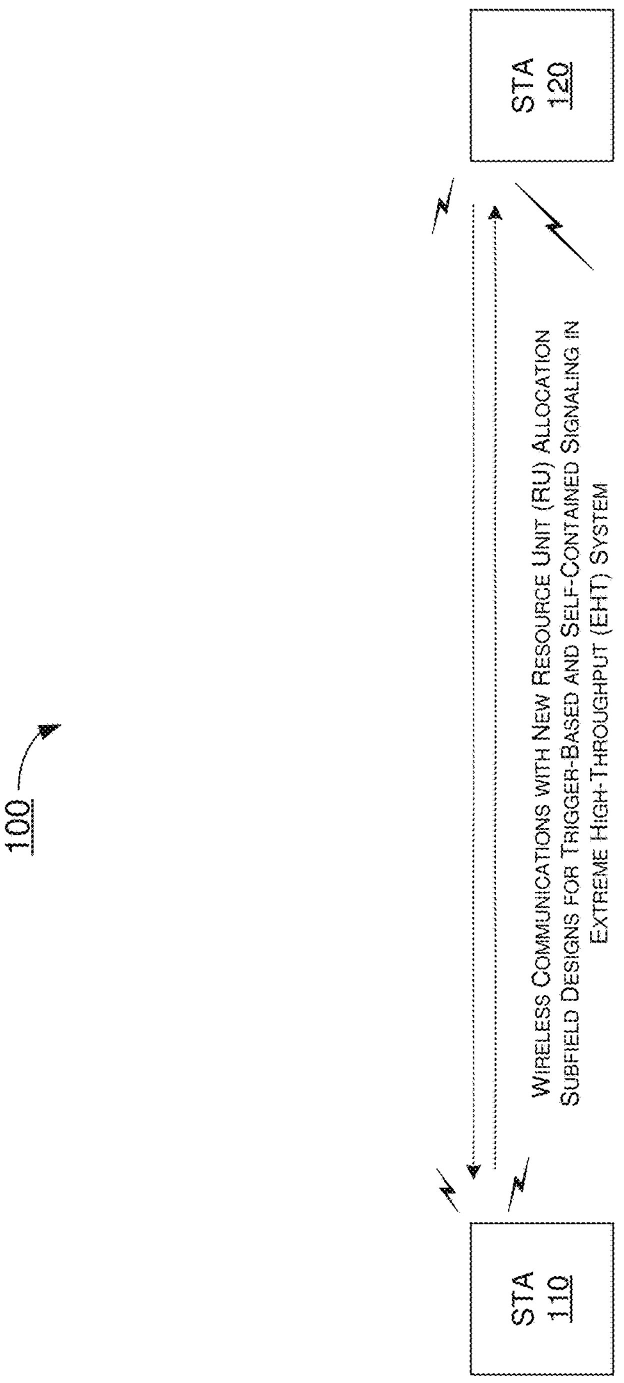
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. FIG. 2~FIG. 19 illustrate examples of implementation of various proposed schemes in network environment 100 in accordance with the present disclosure. The following description of various proposed schemes is provided with reference to FIG. 1~FIG. 19.

Referring to FIG. 1, network environment 100 may involve at least a station (STA) 110 communicating wirelessly with a STA 120. Each of STA 110 and STA 120 may be a non-access point (non-AP) STA or, alternatively, either of STA 110 and STA 120 may function as an AP. In some cases, STA 110 and STA 120 may be associated with a basic service set (BSS) in accordance with one or more IEEE 802.11 standards (e.g., IEEE 802.11be and future-developed standards). Each of STA 110 and STA 120 may be configured to communicate with each other by utilizing the new RU allocation subfield designs for trigger-based and self-contained signaling in EHT systems in accordance with various proposed schemes described below. That is, either or both of STA 110 and STA 120 may function as a "user" in the proposed schemes and examples described below.

In IEEE 802.11ax, DL HE-SIG-B and UL trigger frame use different RU allocation subfield designs for the RU allocation subfield in the user information field of a trigger frame, although both use eight bits (e.g., bits B7~B0, with bit B7 being the most-significant bit (MSB) and bit B0 being the least-significant bit (LSB)) for the RU allocation subfield to indicate RU assignment for each user. For the RU allocation subfield used in trigger-based (TB) physical layer convergence procedure protocol data unit (PPDU) signaling, bits B7~B1 are used to indicate each RU index in an 80-MHz segment, and bit B0 is used to indicate each 80-MHz segment. That is, B0=0 for bandwidth (BW)=20 MHz, 40 MHz or 80 MHz or a primary 80-MHz bandwidth when BW=160 MHz or 80+80 MHz, with B0=1 for a secondary 80-MHz bandwidth when BW=160 MHz or 80+80 MHz.

FIG. 2 illustrates a summary 200 of RUs and aggregated MRUs as defined in IEEE 802.11be, showing the maximum number of RUs and MRUs for each channel width. In summary 200, the value indicated in the "RU size" column indicates the size of a RU or MRU in terms of a number of tones. For instance, "26" indicates an RU of 26 tones (herein interchangeably referred to as "RU26"), "52" indicates an RU of 52 tones (herein interchangeably referred to as "RU52"), "78" indicates an MRU of 78 tones as an aggregate of RU26 and RU52 (herein interchangeably referred to as "MRU78" or "MRU(26+52)"), and so on.

Figure 3:
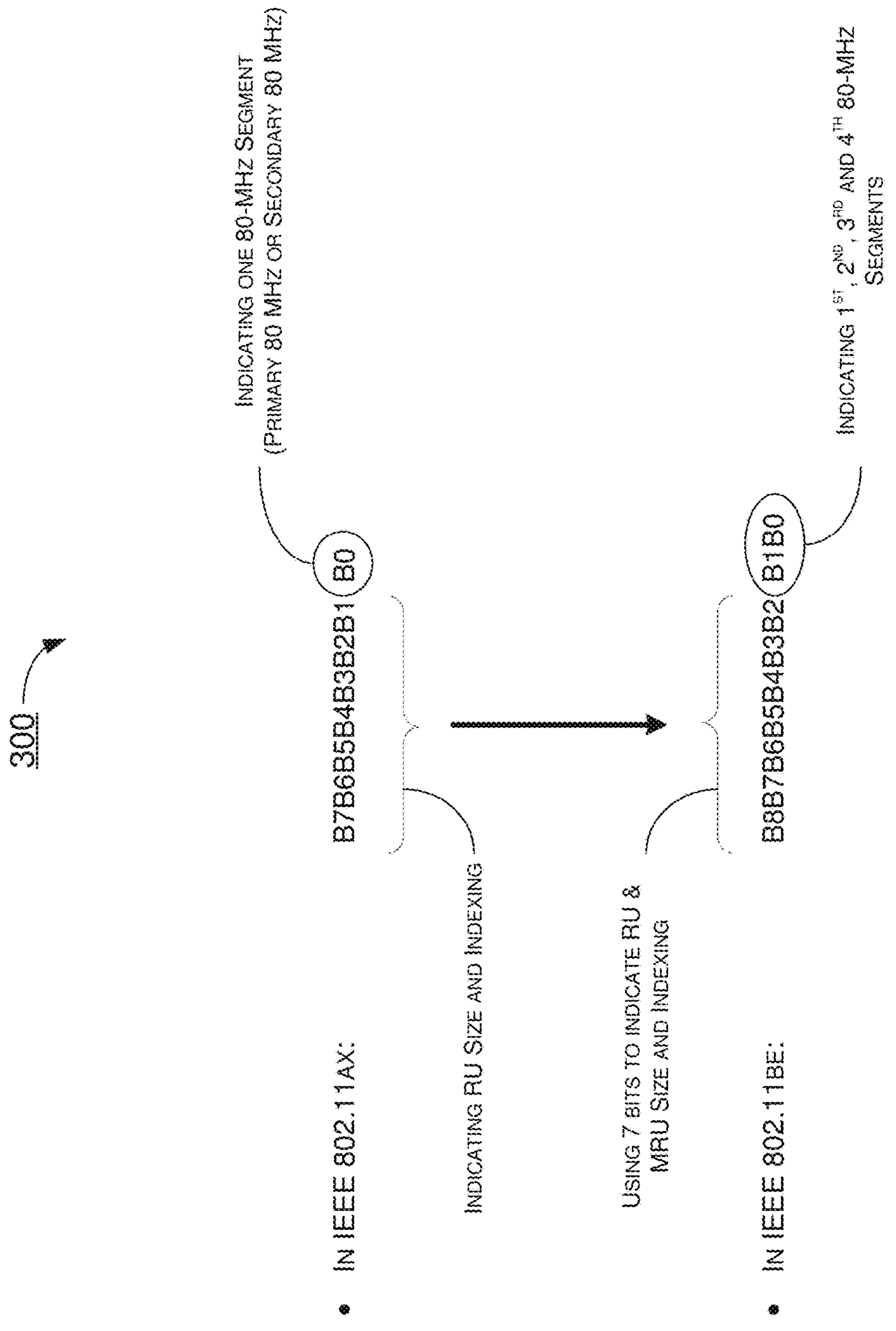
FIG. 3 is a diagram of an example scenario under a proposed scheme in accordance with the present disclosure.

FIG. 3 illustrates an example scenario 300 under a proposed scheme in accordance with the present disclosure. Under the proposed scheme, the 8-bit RU allocation subfield defined in IEEE 802.11ax may be extended by adding one bit for a 9-bit RU allocation subfield design in IEEE 802.11be and future wireless technologies. That is, total nine bits may be utilized for IEEE 802.11be RU allocation subfield for either trigger frame signaling or self-contained EHT-SIG signaling. Moreover, under the proposed scheme, the IEEE 802.11be RU allocation field may indicate both regular single RU and aggregated multi-RU (MRU). As shown in FIG. 3, among the nine bits of the RU allocation subfield for IEEE 802.11be (e.g., bits B8B7B6B5B4B3B2B1 B0), the most significant seven bits (e.g., B8B7B6B5B4B3B2) may be utilized to indicate the RU and MRU size and indexing while the least significant two bits (e.g., B1 B0) may be utilized to indicate each 80 MHz segment, in which of up to four 80-MHz segments (of a bandwidth up to a 320-MHz bandwidth) the RU/MRU is allocated, or B1 may be used to indicate which of two 80-MHz segments the RU/MRU is allocated in a 160-MHz bandwidth/segment and B0 may be used to indicate which of two 160-MHz segment the RU/MRU is allocated in a 320-MHz bandwidth.

FIG. 4 illustrates an example design 400 in accordance with a proposed scheme in accordance with the present disclosure. Referring to FIG. 4, entries in the upper portion of an RU allocation table of design 400 may be the same as those in IEEE 802.11ax, while entries in the lower portion of the RU allocation table of design 400 may be new and used for aggregated multi-RUs for IEEE 802.11be and future wireless technologies. For those entries (0~68) of RUs supported in IEEE 802.11ax, the subfield values of bits B8~B2 may be kept the same as the subfield values of bits B7~B1 in the IEEE 802.11ax RU allocation subfield.

In design 400, nine bits (e.g., bits B8~B0) are used for the RU allocation subfield. Under the proposed scheme, the most significant seven bits (namely, bits B8~B2) of the RU allocation subfield may be used to indicate an RU index within a respective 80-MHz segment of a given bandwidth (e.g., 320 MHz or 160 MHz), and the least significant two bits (namely, bits B1 B0) of the RU allocation subfield may be used to indicate or otherwise identify the respective 80-MHz segment of the given bandwidth in which RU allocation is located. For instance, a decimal value of 0 (corresponding to "00" for bits B1 B0) may indicate a first 80-MHz segment, a decimal value of 1 (corresponding to "01" for bits B1B0) may indicate a second 80-MHz segment, a decimal value of 2 (corresponding to "10" for bits B1 B0) may indicate a third 80-MHz segment, and a decimal value of 3 (corresponding to "11" for bits B1 B0) may indicate a fourth 80-MHz segment.

Figure 5:
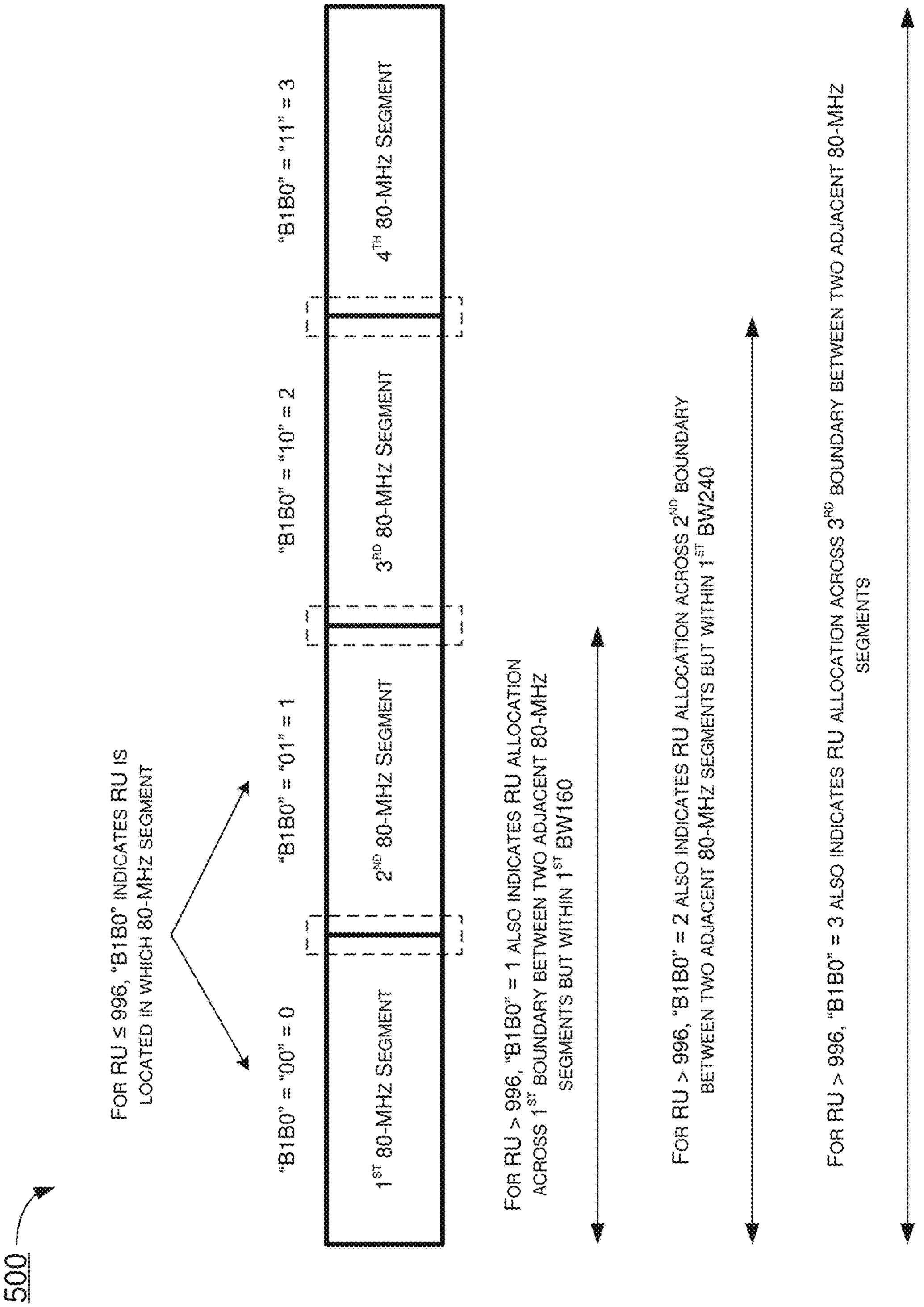
FIG. 5 is a diagram of an example design under the second proposed scheme in accordance with the present disclosure.

FIG. 5 illustrates an example design 500 in accordance with a proposed scheme in accordance with the present disclosure. Specifically, FIG. 5 provides an illustration of how the two least significant bits, B1 B0, of the RU allocation subfield may be utilized to indicate in which 80-MHz segment(s) an RU/MRU of a size equal to or less than 996 tones, as well as a size greater than 996 tones, may be located.

For RUs and MRUs with a size equal to or less than 996 tones (RU≤996), a decimal value of 0 (corresponding to "00" for bits B1 B0) may indicate RU allocation in a first 80-MHz segment, a decimal value of 1 (corresponding to "01" for bits B1 B0) may indicate RU allocation in a second 80-MHz segment, a decimal value of 2 (corresponding to "10" for bits B1 B0) may indicate RU allocation in a third 80-MHz segment, and a decimal value of 3 (corresponding to "11" for bits B1 B0) may indicate RU allocation in a fourth 80-MHz segment.

For RUs and MRUs with a size greater than 996 tones (RU or MRU>996), a decimal value of 1 (corresponding to "01" for bits B1 B0) may indicate RU allocation across a first boundary, which is between the first and the second 80-MHz segments, and within a first 160-MHz segment of a 320-MHz bandwidth. Similarly, a decimal value of 2 (corresponding to "10" for bits B1B0) may indicate RU allocation across a second boundary, which is between the second and the third 80-MHz segments, and within a first 240-MHz segment of the 320-MHz bandwidth. Likewise, a decimal value of 3 (corresponding to "11" for bits B1 B0) may indicate RU allocation across a third boundary, which is between the third and the fourth 80-MHz segments.

Figure 6:
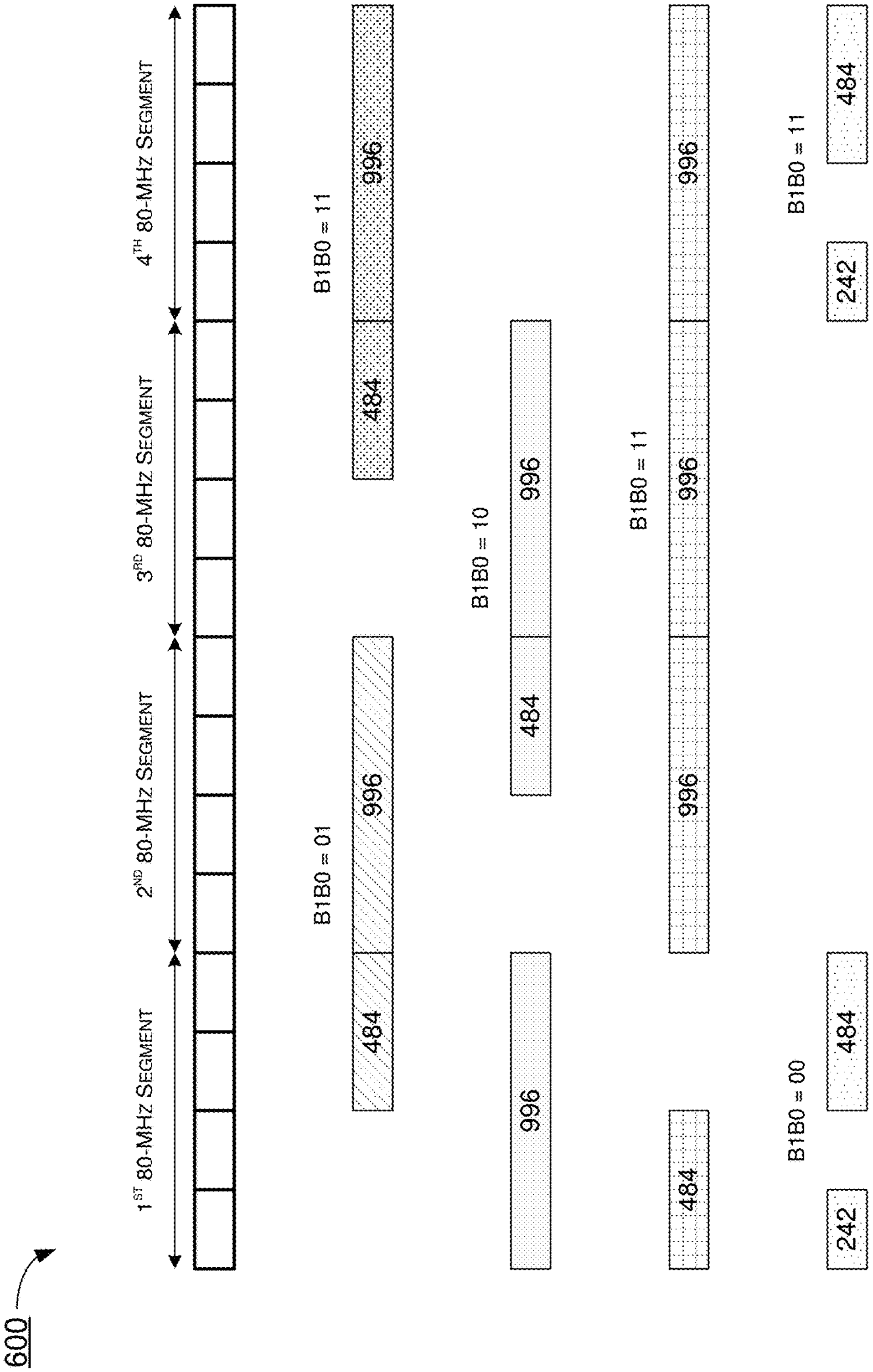
FIG. 6 is a diagram of an example scenario under a proposed scheme in accordance with the present disclosure.

FIG. 6 illustrates an example scenario 600 in accordance with a proposed scheme in accordance with the present disclosure. In scenario 600, for aggregated MRUs with a size greater than 996 tones (RU>996), the two bits B1 B0 are shown to be used to indicate various cross-boundary RU allocations. For instance, allocation of an aggregated MRU of MRU(484+996) across the boundary between the first and the second 80-MHz segments (and within the first 160-MHz segment of the 320-MHz bandwidth) may be indicated with B1 B0 being "01." Additionally, allocation of an aggregated MRU of MRU(484+996) across the boundary between the third and the fourth 80-MHz segments (and within the second 160-MHz segment of the 320-MHz bandwidth) may be indicated with B1 B0 being "11." Moreover, allocation of an aggregated MRU of MRU(996+484+996) across the boundary between the second and the third 80-MHz segments may be indicated with B1 B0 being "10." Furthermore, allocation of an aggregated MRU of MRU(484+996+996+996) across the boundary between the second and the third 80-MHz segments and the boundary between the third and the fourth 80-MHz segments may be indicated with B1 B0 being "11."

In scenario 600, for RUs and MRUs with a size equal to or less than 996 tones (RU or MRU≤996), allocation of an aggregated MRU of MRU(242+484) in the first 80-MHz segment may be indicated with B1 B0 being "00." Similarly, allocation of an aggregated MRU of MRU(242+484) in the fourth 80-MHz segment may be indicated with B1 B0 being "11."

Figure 7:
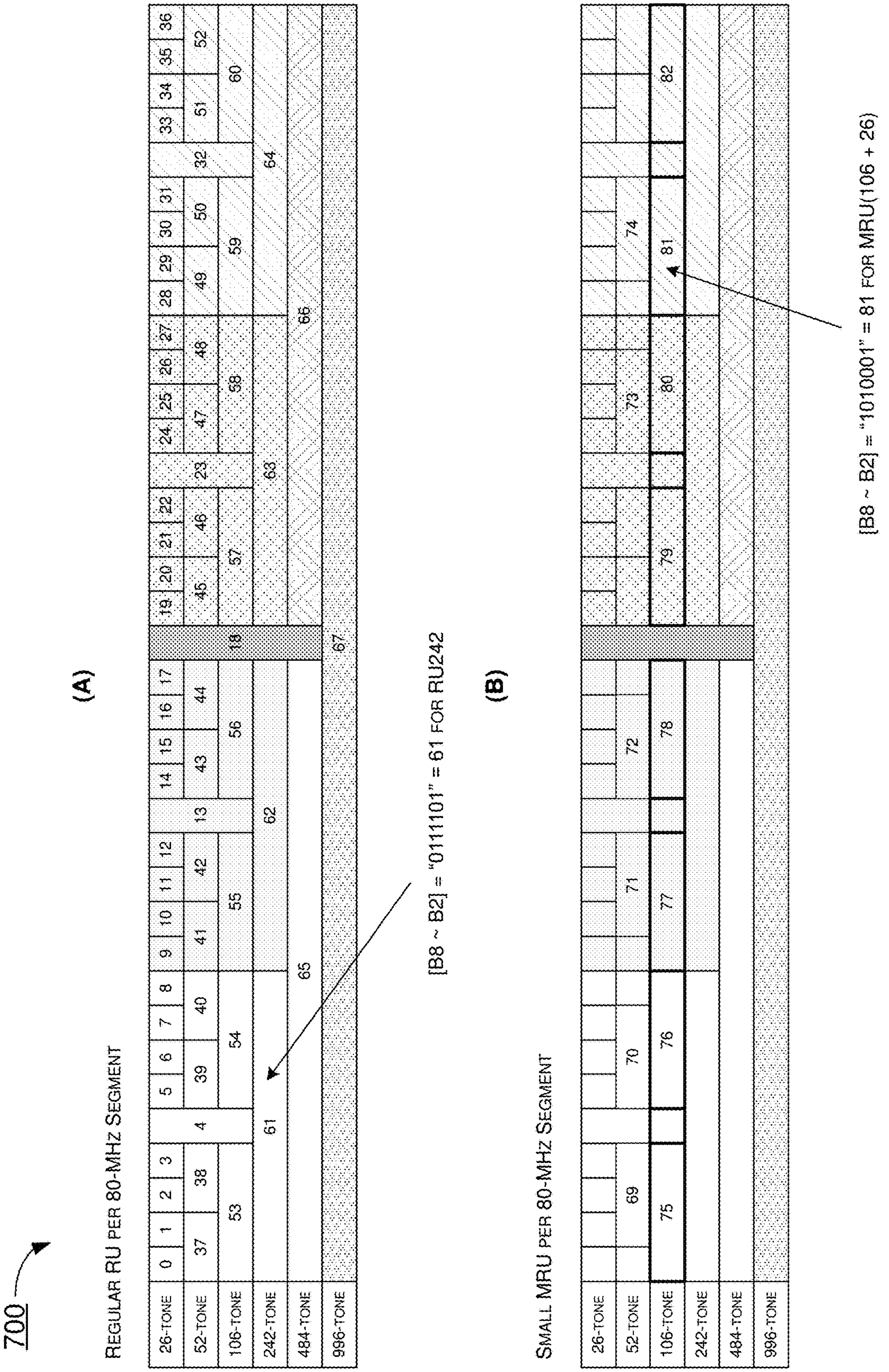
FIG. 7 is a diagram of an example scenario under a proposed scheme in accordance with the present disclosure.

FIG. 7 illustrates an example scenario 700 in accordance with a proposed scheme in accordance with the present disclosure. In scenario 700, the seven bits of B8~B2 of the RU allocation subfield may be assigned different values to indicate various RU allocations. Specifically, part (A) of FIG. 7 shows an example of allocation of regular RUs per 80-MHz segment. For instance, as shown in part (A) of FIG. 7, B8~B2 being "0111101", corresponding to a decimal value of 61, may be used to indicate an RU242. Moreover, part (B) of FIG. 7 shows an example of allocation of small MRUs per 80-MHz segment. For instance, as shown in part (B) of FIG. 7, B8~B2 being "1010001", corresponding to a decimal value of 81, may be used to indicate an aggregated MRU of MRU(106+26).

Figure 8:
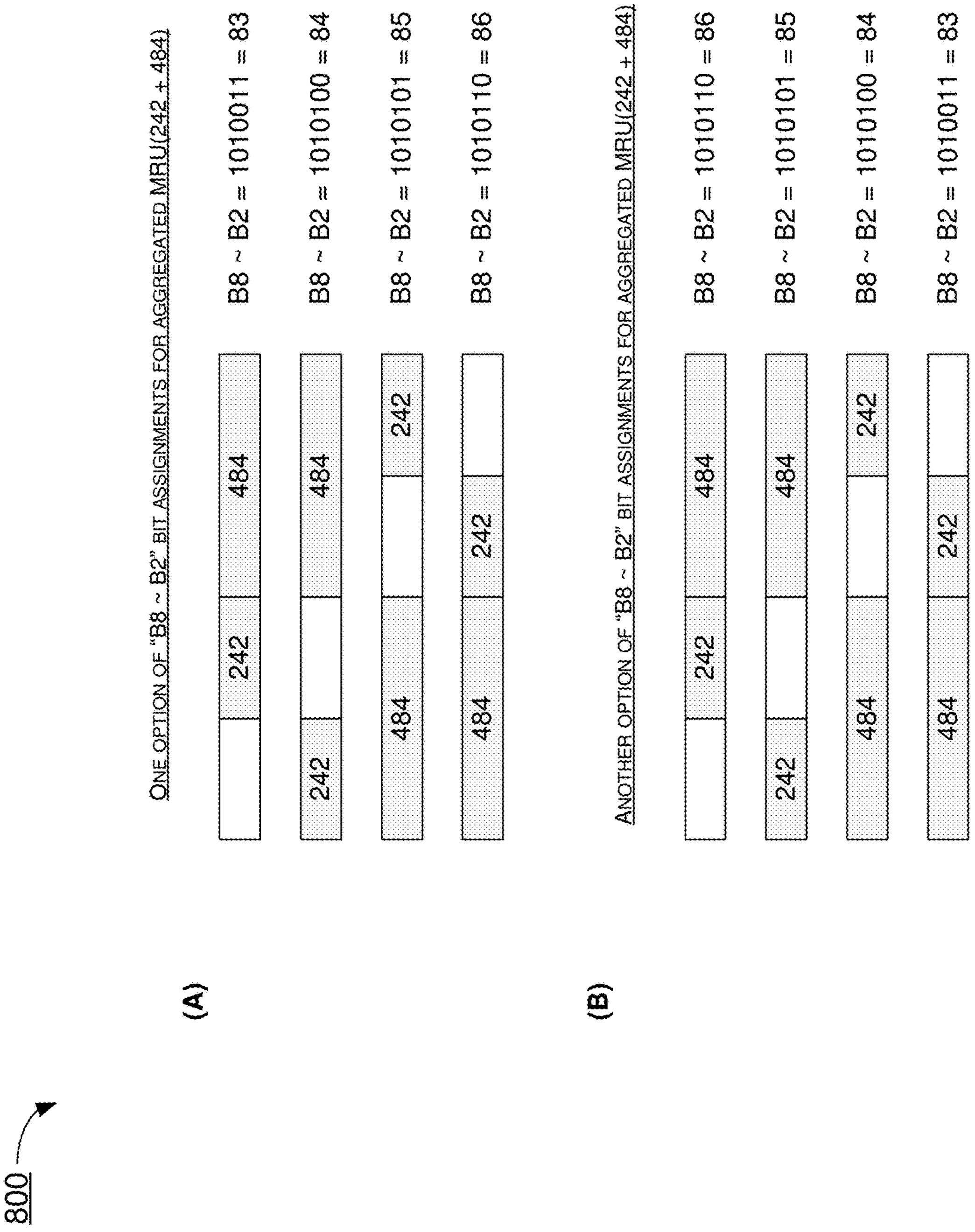
FIG. 8 is a diagram of an example scenario under a proposed scheme in accordance with the present disclosure.

FIG. 8 illustrates an example scenario 800 in accordance with a proposed scheme in accordance with the present disclosure. In scenario 800, the seven bits of B8~B2 of the RU allocation subfield may be assigned different values to indicate various MRU allocations per 80-MHz segment. Part (A) of FIG. 8 shows one option of assigning different values to B8~B2 to indicate various allocations of an aggregated MRU of MRU(242+484). For instance, B8~B2 being "1010011", corresponding to a decimal value of 83, may be used to indicate allocation of RU242 to a second 20-MHz segment and allocation of RU484 to a third and a fourth 20-MHz segments. Additionally, B8~B2 being "1010100", corresponding to a decimal value of 84, may be used to indicate allocation of RU242 to a first 20-MHz segment and allocation of RU484 to the third and the fourth 20-MHz segments. Moreover, B8~B2 being "1010101", corresponding to a decimal value of 85, may be used to indicate allocation of RU484 to the first and the second 20-MHz segments and allocation of RU242 to the fourth 20-MHz segment. Furthermore, B8~B2 being "1010110", corresponding to a decimal value of 86, may be used to indicate allocation of RU484 to the first and the second 20-MHz segments and allocation of RU242 to the third 20-MHz segment.

Part (B) of FIG. 8 shows an alternative option of assigning different values to B8~B2 to indicate various allocations of an aggregated MRU of MRU(242+484) per 80-MHz frequency segment. For instance, B8~B2 being "1010110", corresponding to a decimal value of 86, may be used to indicate allocation of RU242 to a second 20-MHz segment and allocation of RU484 to a third and a fourth 20-MHz segments. Additionally, B8~B2 being "1010101", corresponding to a decimal value of 85, may be used to indicate allocation of RU242 to a first 20-MHz segment and allocation of RU484 to the third and the fourth 20-MHz segments. Moreover, B8~B2 being "1010011", corresponding to a decimal value of 84, may be used to indicate allocation of RU484 to the first and the second 20-MHz segments and allocation of RU242 to the fourth 20-MHz segment. Furthermore, B8~B2 being "1010011", corresponding to a decimal value of 83, may be used to indicate allocation of RU484 to the first and the second 20-MHz segments and allocation of RU242 to the third 20-MHz segment.

Figure 9:
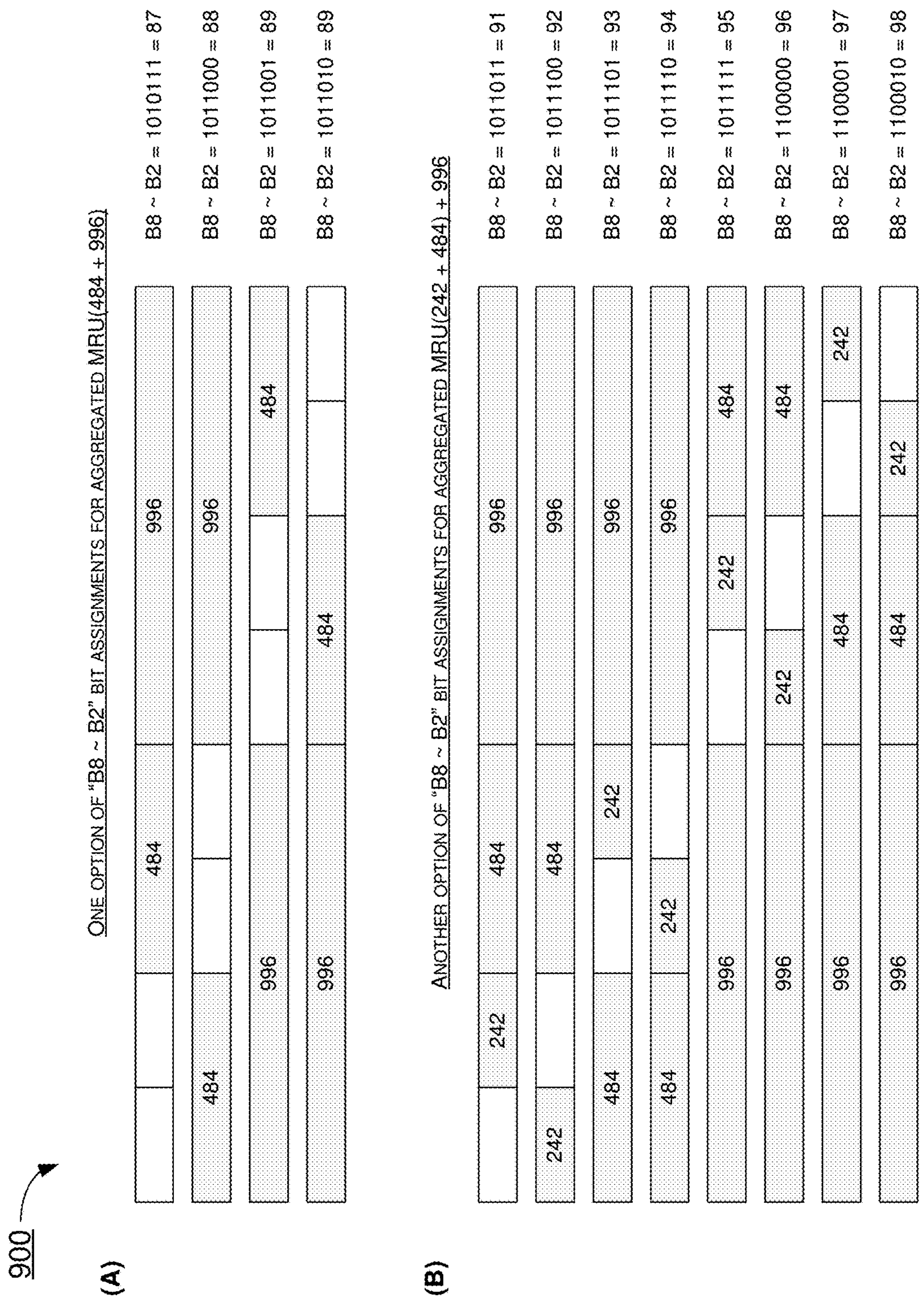
FIG. 9 is a diagram of an example scenario under a proposed scheme in accordance with the present disclosure.

FIG. 9 illustrates an example scenario 900 in accordance with a proposed scheme in accordance with the present disclosure. In scenario 900, the seven bits of B8~B2 of the RU allocation subfield may be assigned different values to indicate various RU allocations. Part (A) of FIG. 9 shows one option of assigning different values to B8~B2 to indicate various allocations of an aggregated MRU of MRU(484+996) in a 160-MHz frequency segment. For instance, B8~B2 being "1010111", corresponding to a decimal value of 87, may be used to indicate allocation of RU484 to the second half (or a third and a fourth 20-MHz segments) of a first 80-MHz segment and allocation of RU996 to a second 80-MHz segment. Additionally, B8~B2 being "1011000", corresponding to a decimal value of 88, may be used to indicate allocation of RU484 to the first half (or a first and a second 20-MHz segments) of the first 80-MHz segment and allocation of RU996 to the second 80-MHz segment. Moreover, B8~B2 being "1011001", corresponding to a decimal value of 89, may be used to indicate allocation of RU484 to the second half of the second 80-MHz segment and allocation of RU996 to the first 80-MHz segment. Furthermore, B8~B2 being "1011010", corresponding to a decimal value of 90, may be used to indicate allocation of RU996 to the first 80-MHz segment and allocation of RU484 to the first half of the second 80-MHz segment.

Part (B) of FIG. 9 shows one option of assigning different values to B8~B2 to indicate various allocations of an aggregated MRU of MRU(242+484+996). For instance, B8~B2 being "1011011", corresponding to a decimal value of 91, may be used to indicate allocation of RU242 to a second 20-MHz segment of a first 80-MHz segment, allocation of RU484 to a third and a fourth 20-MHz segments of the first 80-MHz segment, and allocation of RU996 to a second 80-MHz segment. Additionally, B8~B2 being "1011100", corresponding to a decimal value of 92, may be used to indicate allocation of RU242 to a first 20-MHz segment of the first 80-MHz segment, allocation of RU484 to the third and the fourth 20-MHz segments of the first 80-MHz segment, and allocation of RU996 to the second 80-MHz segment. Moreover, B8~B2 being "1011101", corresponding to a decimal value of 93, may be used to indicate allocation of RU484 to the first and the second 20-MHz segments of the first 80-MHz segment, allocation of RU242 to the fourth 20-MHz segments of the first 80-MHz segment, and allocation of RU996 to the second 80-MHz segment. Furthermore, B8~B2 being "1011110", corresponding to a decimal value of 94, may be used to indicate allocation of RU484 to the first and the second 20-MHz segments of the first 80-MHz segment, allocation of RU242 to the third 20-MHz segments of the first 80-MHz segment, and allocation of RU996 to the second 80-MHz segment. Similarly, B8~B2 being "1011111", corresponding to a decimal value of 95, may be used to indicate allocation of RU996 to the first 80-MHz segment, allocation of RU242 to the second 20-MHz segments of the second 80-MHz segment, and allocation of RU484 to the third and the fourth 20-MHz segments of the second 80-MHz segment. Additionally, B8~B2 being "1100000", corresponding to a decimal value of 96, may be used to indicate allocation of RU996 to the first 80-MHz segment, allocation of RU242 to the first 20-MHz segments of the second 80-MHz segment, and allocation of RU484 to the third and the fourth 20-MHz segments of the second 80-MHz segment. Moreover, B8~B2 being "1100001", corresponding to a decimal value of 97, may be used to indicate allocation of RU996 to the first 80-MHz segment, allocation of RU484 to the first and the second 20-MHz segments of the second 80-MHz segment, and allocation of RU242 to the fourth 20-MHz segments of the second 80-MHz segment. Furthermore, B8~B2 being "1100010", corresponding to a decimal value of 98, may be used to indicate allocation of RU996 to the first 80-MHz segment, allocation of RU484 to the first and the second 20-MHz segments of the second 80-MHz segment, and allocation of RU242 to the third 20-MHz segments of the second 80-MHz segment.

Figure 10:
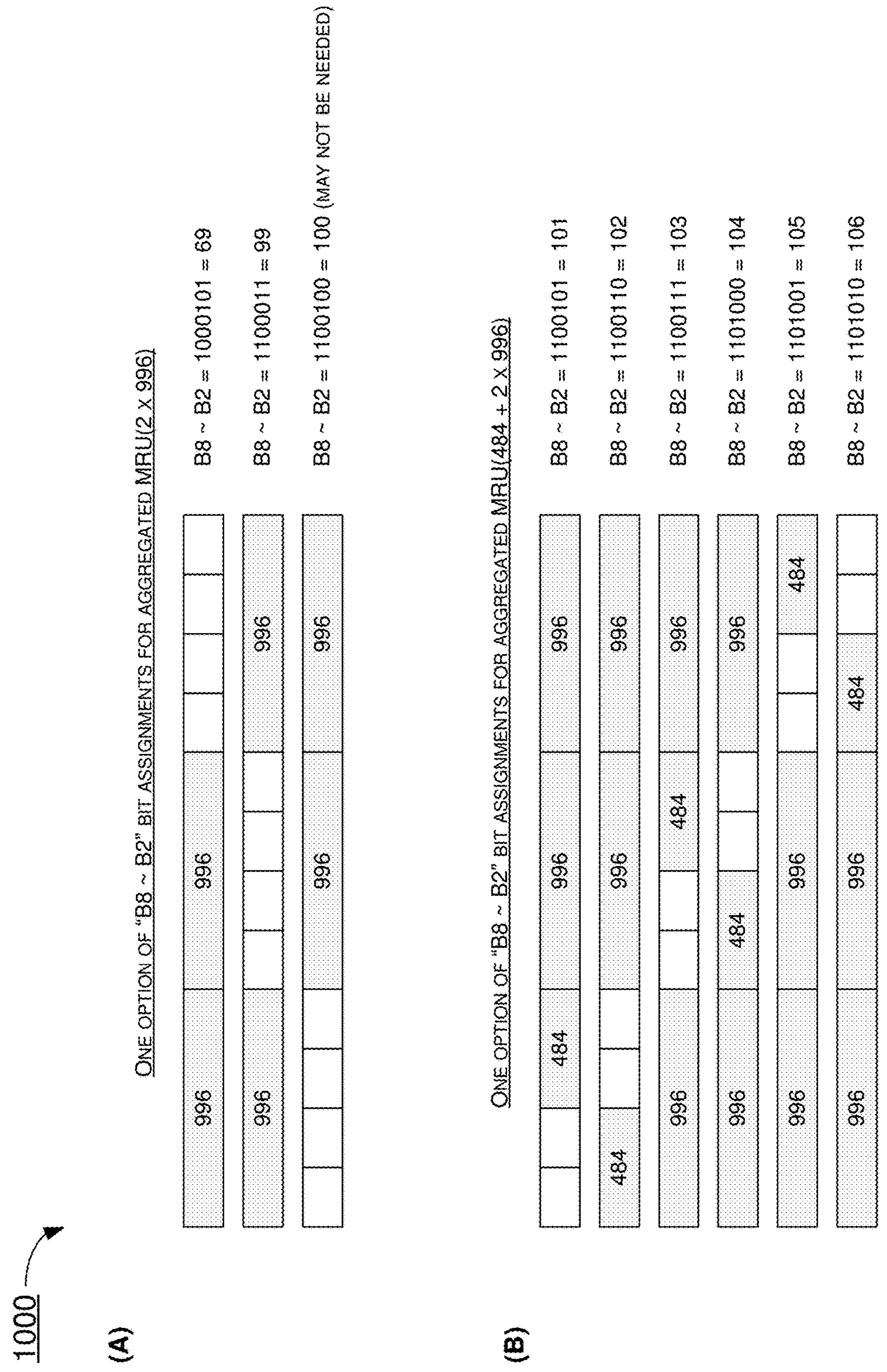
FIG. 10 is a diagram of an example scenario under a proposed scheme in accordance with the present disclosure.

FIG. 10 illustrates an example scenario 1000 in accordance with a proposed scheme in accordance with the present disclosure. In scenario 1000, the seven bits of B8~B2 of the RU allocation subfield may be assigned different values to indicate various RU allocations. Part (A) of FIG. 10 shows one option of assigning different values to B8~B2 to indicate various allocations of an aggregated MRU of RU(2×996) in a 240-MHz frequency segment. For instance, B8~B2 being "1000101", corresponding to a decimal value of 69, may be used to indicate allocation of one RU996 to a first 80-MHz segment and allocation of another RU996 to a second 80-MHz segment. Additionally, B8~B2 being "1100011", corresponding to a decimal value of 99, may be used to indicate allocation of one RU996 to the first 80-MHz segment and allocation of another RU996 to a third 80-MHz segment. Moreover, B8~B2 being "1100100", corresponding to a decimal value of 100, may be used to indicate allocation of one RU996 to the second 80-MHz segment and allocation of another RU996 to the third 80-MHz segment.

Part (B) of FIG. 10 shows one option of assigning different values to B8~B2 to indicate various allocations of an aggregated MRU of MRU(484+2×996) in a 240-MHz frequency segment. For instance, B8~B2 being "1100101", corresponding to a decimal value of 101, may be used to indicate allocation of RU484 to a third and a fourth 20-MHz segments of a first 80-MHz segment, allocation of one RU996 to a second 80-MHz segment, and allocation of another RU996 to a third 80-MHz segment. Also, B8~B2 being "1100110", corresponding to a decimal value of 102, may be used to indicate allocation of RU484 to a first and a second 20-MHz segments of the first 80-MHz segment, allocation of one RU996 to the second 80-MHz segment, and allocation of another RU996 to the third 80-MHz segment. Moreover, B8~B2 being "1100111", corresponding to a decimal value of 103, may be used to indicate allocation of one RU996 to the first 80-MHz segment, allocation of RU484 to a third and a fourth 20-MHz segments of the second 80-MHz segment, and allocation of another RU996 to the third 80-MHz segment. Additionally, B8~B2 being "1101000", corresponding to a decimal value of 104, may be used to indicate allocation of one RU996 to the first 80-MHz segment, allocation of RU484 to a first and a second 20-MHz segments of the second 80-MHz segment, and allocation of another RU996 to the third 80-MHz segment. Moreover, B8~B2 being "1101001", corresponding to a decimal value of 105, may be used to indicate allocation of one RU996 to the first 80-MHz segment, allocation of another RU996 to the second 80-MHz segment, and allocation of RU484 to a third and a fourth 20-MHz segments of the third 80-MHz segment. Furthermore, B8~B2 being "1101010", corresponding to a decimal value of 106, may be used to indicate allocation of one RU996 to the first 80-MHz segment, allocation of another RU996 to the second 80-MHz segment, and allocation of RU484 to a first and a second 20-MHz segments of the third 80-MHz segment.

Figure 11:
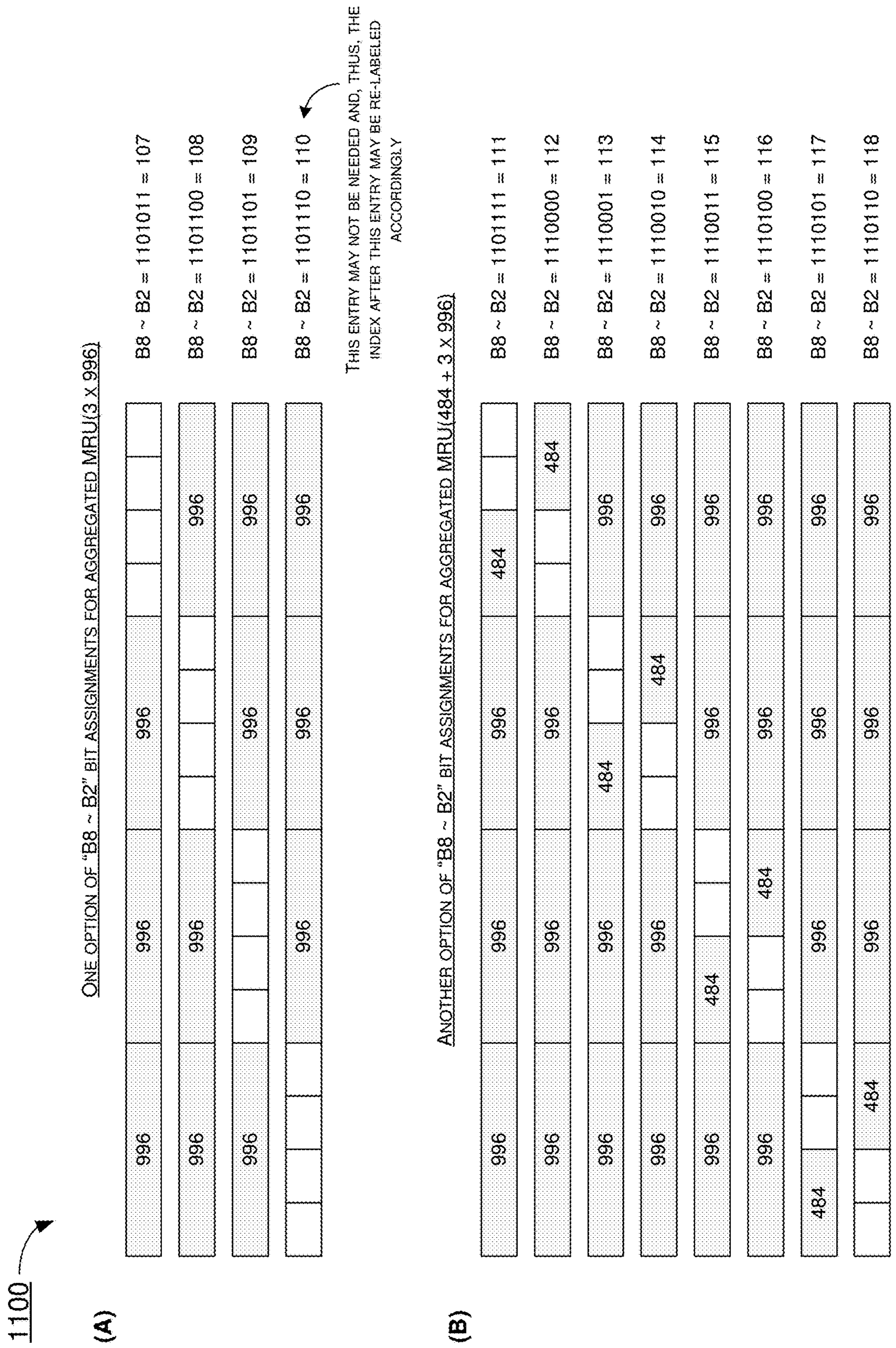
FIG. 11 is a diagram of an example scenario under a proposed scheme in accordance with the present disclosure.

FIG. 11 illustrates an example scenario 1100 in accordance with a proposed scheme in accordance with the present disclosure. In scenario 1100, the seven bits of B8~B2 of the RU allocation subfield may be assigned different values to indicate various RU allocations. Part (A) of FIG. 11 shows one option of assigning different values to B8~B2 to indicate various allocations of an aggregated MRU of MRU(3×996) in a 320-MHz bandwidth. For instance, B8~B2 being "1101011", corresponding to a decimal value of 107, may be used to indicate allocation of a first RU996 to a first 80-MHz segment, allocation of a second RU996 to a second 80-MHz segment, and allocation of a third RU996 to a third 80-MHz segment. Additionally, B8~B2 being "1101100", corresponding to a decimal value of 108, may be used to indicate allocation of the first RU996 to the first 80-MHz segment, allocation of the second RU996 to the second 80-MHz segment, and allocation of the third RU996 to a fourth 80-MHz segment. Moreover, B8~B2 being "1101101", corresponding to a decimal value of 109, may be used to indicate allocation of the first RU996 to the first 80-MHz segment, allocation of the second RU996 to the third 80-MHz segment, and allocation of the third RU996 to the fourth 80-MHz segment. Furthermore, B8~B2 being "1101110", corresponding to a decimal value of 110, may be used to indicate allocation of the first RU996 to the second 80-MHz segment, allocation of the second RU996 to the third 80-MHz segment, and allocation of the third RU996 to the fourth 80-MHz segment.

Part (B) of FIG. 11 shows one option of assigning different values to B8~B2 to indicate various allocations of an aggregated MRU of MRU(484+3×996) in a 320-MHz bandwidth. For instance, B8~B2 being "1101111", corresponding to a decimal value of 111, may be used to indicate allocation of a first RU996 to a first 80-MHz segment, allocation of a second RU996 to a second 80-MHz segment, allocation of a third RU996 to a third 80-MHz segment, and allocation of RU484 to the first half of a fourth 80-MHz segment. Additionally, B8~B2 being "1110000", corresponding to a decimal value of 112, may be used to indicate allocation of the first RU996 to the first 80-MHz segment, allocation of the second RU996 to the second 80-MHz segment, allocation of the third RU996 to the third 80-MHz segment, and allocation of RU484 to the second half of the fourth 80-MHz segment. Moreover, B8~B2 being "1110001", corresponding to a decimal value of 113, may be used to indicate allocation of the first RU996 to the first 80-MHz segment, allocation of the second RU996 to the second 80-MHz segment, allocation of RU484 to the first half of the third 80-MHz segment, and allocation of the third RU996 to the fourth 80-MHz segment. Furthermore, B8~B2 being "1110010", corresponding to a decimal value of 114, may be used to indicate allocation of the first RU996 to the first 80-MHz segment, allocation of the second RU996 to the second 80-MHz segment, allocation of RU484 to the second half of the third 80-MHz segment, and allocation of the third RU996 to the fourth 80-MHz segment. Also, B8~B2 being "1110011", corresponding to a decimal value of 115, may be used to indicate allocation of the first RU996 to the first 80-MHz segment, allocation of RU484 to the first half of the second 80-MHz segment, allocation of the second RU996 to the third 80-MHz segment, and allocation of the third RU996 to the fourth 80-MHz segment. Additionally, B8~B2 being "1110100", corresponding to a decimal value of 116, may be used to indicate allocation of the first RU996 to the first 80-MHz segment, allocation of RU484 to the second half of the second 80-MHz segment, allocation of the second RU996 to the third 80-MHz segment, and allocation of the third RU996 to the fourth 80-MHz segment. Moreover, B8~B2 being "1110101", corresponding to a decimal value of 117, may be used to indicate allocation of RU484 to the first half of the first 80-MHz segment, allocation of the first RU996 to the second 80-MHz segment, allocation of the second RU996 to the third 80-MHz segment, and allocation of the third RU996 to the fourth 80-MHz segment. Furthermore, B8~B2 being "1110110", corresponding to a decimal value of 118, may be used to indicate allocation of RU484 to the second half of the first 80-MHz segment, allocation of the first RU996 to the second 80-MHz segment, allocation of the second RU996 to the third 80-MHz segment, and allocation of the third RU996 to the fourth 80-MHz segment.

Figure 12:
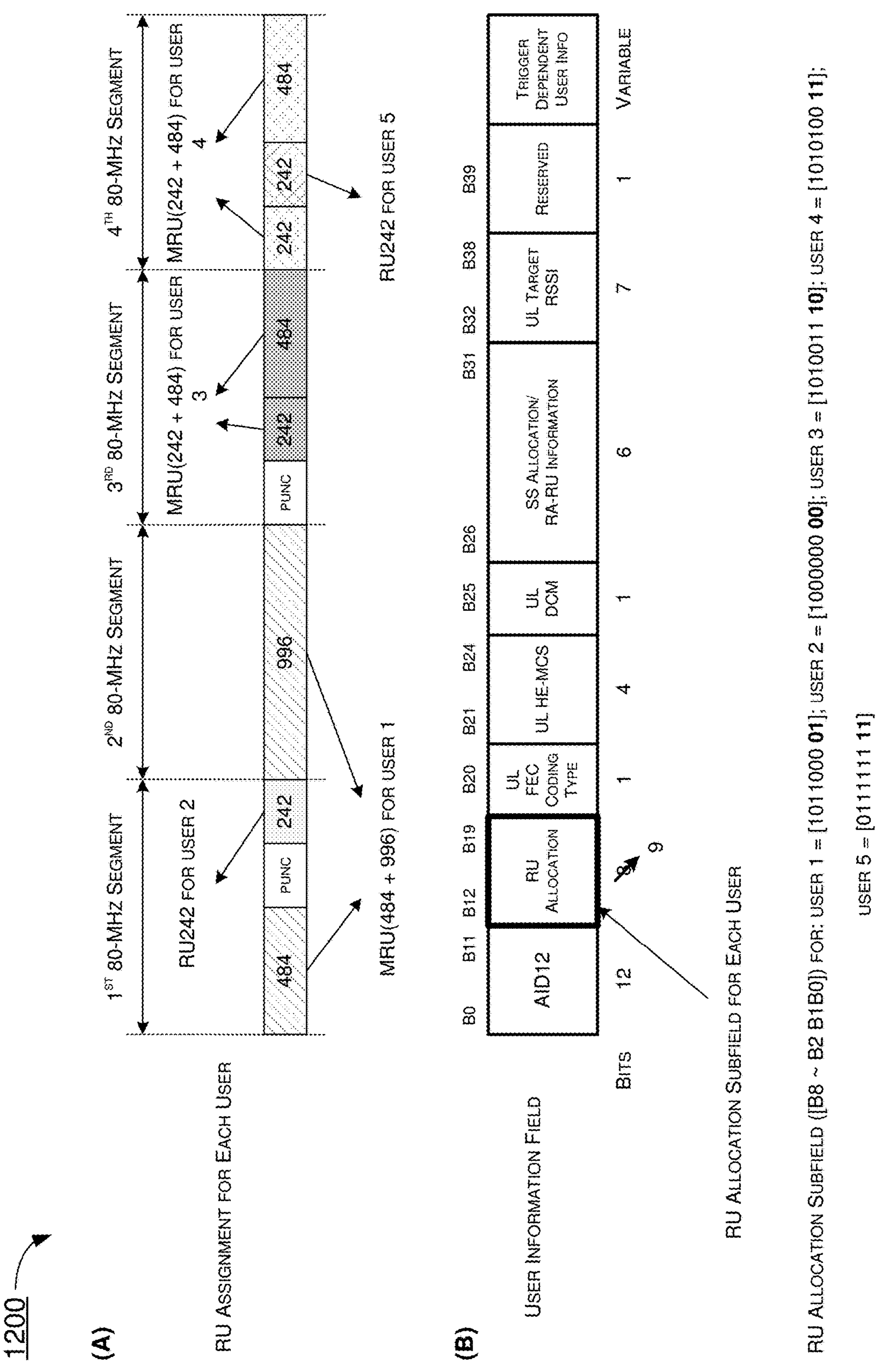
FIG. 12 is a diagram of an example scenario under a proposed scheme in accordance with the present disclosure.

FIG. 12 illustrates an example scenario 1200 of trigger-based RU allocation signaling in accordance with a proposed scheme in accordance with the present disclosure. Part (A) of FIG. 12 shows an example of allocations of different RUs and aggregated MRUs in different 80-MHz segments to different users under the proposed scheme. Referring to part (A) of FIG. 12, an aggregated MRU of MRU(484+996) may be assigned or allocated to a first user (user 1), with the RU484 in a first 80-MHz segment and the RU996 in a second 80-MHz segment. Also, an RU242 may be assigned or allocated to a second user (user 2), with the RU242 in the first 80-MHz segment. Additionally, an aggregated MRU of MRU(242+484) may be assigned or allocated to a third user (user 3), with the RU242 and RU484 in a third 80-MHz segment. Moreover, another aggregated MRU or MRU (242+484) may be assigned or allocated to a fourth user (user 4), with the RU242 and RU484 in a fourth 80-MHz segment. Furthermore, another RU242 may be assigned or allocated to a fifth user (user 5), with the RU242 in the fourth 80-MHz segment.

Part (B) of FIG. 12 shows an example of indication of user information in the RU allocation field under the proposed scheme. For instance, the seven bits B8~B2 and the two bits B1 B0 of the RU allocation subfield may be [1011000 01] for user 1 of part (A) of FIG. 12, in that a decimal value of 88 of B8~B2 corresponds to entry 88 in the RU allocation table of design 400 for MRU(484+996) allocated across the boundary between a first 80-MHz segment and a second 80-MHz segment of a 320-MHz bandwidth according to a decimal value of 1 of B1 B0. Also, the seven bits B8~B2 and the two bits B1B0 of the RU allocation subfield may be [1000000 00] for user 2 of part (A) of FIG. 12, in that a decimal value of 64 of B8~B2 corresponds to entry 64 in the RU allocation table of design 400 for RU(242) allocated in the first 80-MHz segment of the 320-MHz bandwidth according to a decimal value of 0 of B1 B0. Additionally, the seven bits B8~B2 and the two bits B1 B0 of the RU allocation subfield may be [1010011 10] for user 3 of part (A) of FIG. 12, in that a decimal value of 83 of B8~B2 corresponds to entry 83 in the RU allocation table of design 400 for MRU(242+484) allocated in the third 80-MHz segment of the 320-MHz bandwidth according to a decimal value of 2 of B1 B0. Moreover, the seven bits B8~B2 and the two bits B1 B0 of the RU allocation subfield may be [1010100 11] for user 4 of part (A) of FIG. 12, in that a decimal value of 84 of B8~B2 corresponds to entry 84 in the RU allocation table of design 400 for MRU(242+484) allocated in the fourth 80-MHz segment of the 320-MHz bandwidth according to a decimal value of 3 of B1 B0. Furthermore, the seven bits B8~B2 and the two bits B1 B0 of the RU allocation subfield may be [0111110 11] for user 5 of part (A) of FIG. 12, in that a decimal value of 62 of B8~B2 corresponds to entry 62 in the RU allocation table of design 400 for RU(242) allocated in the fourth 80-MHz segment of the 320-MHz bandwidth according to a decimal value of 3 of B1B0.

Figure 13:
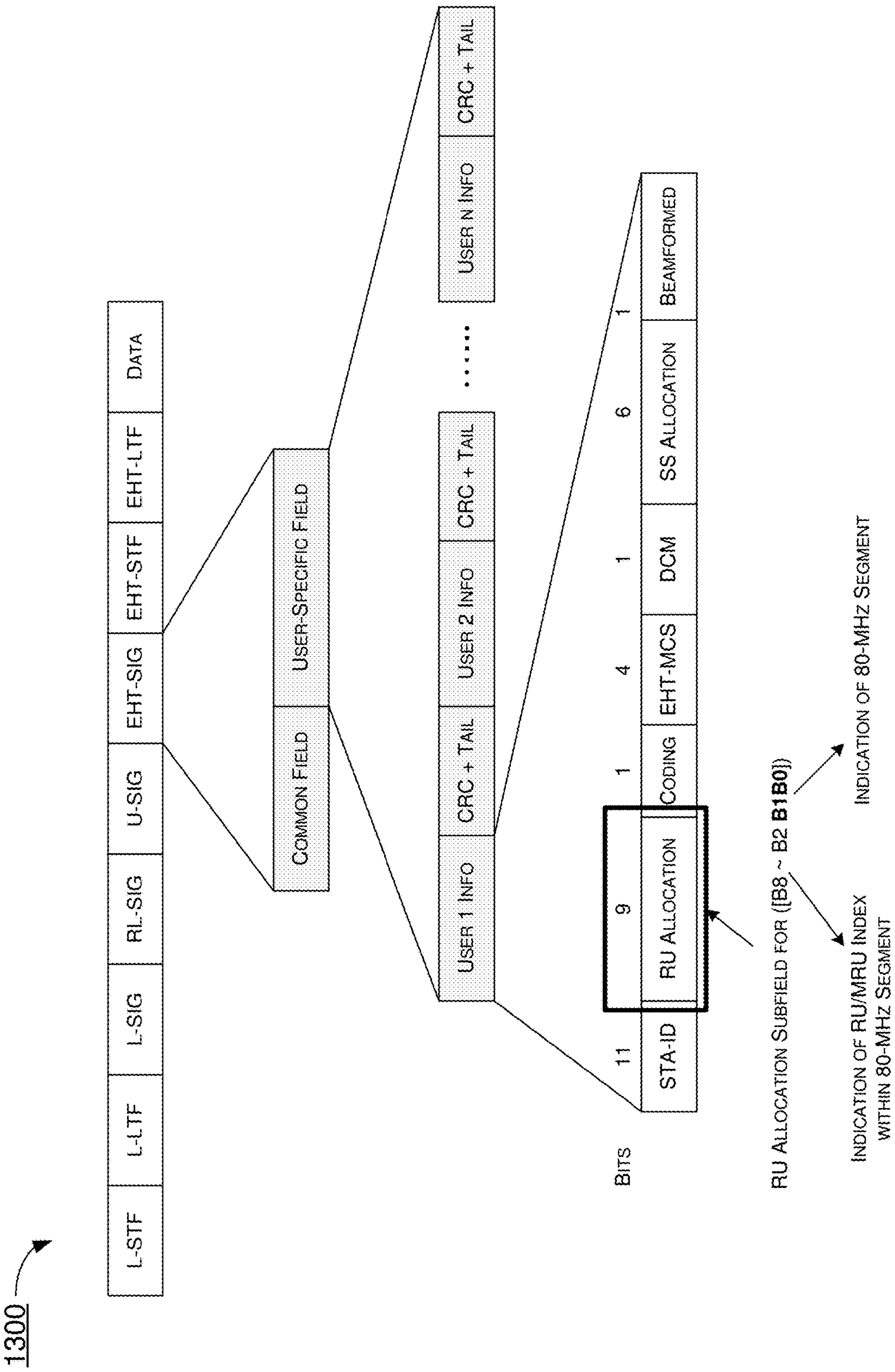
FIG. 13 is a diagram of an example scenario under a proposed scheme in accordance with the present disclosure.

FIG. 13 illustrates an example scenario 1300 of self-contained RU allocation signaling for DL EHT-SIG signaling in accordance with a proposed scheme in accordance with the present disclosure. Under the proposed scheme, similar to UL trigger frame signaling, self-contained type signaling may also be used for DL EHT PPDUs. For instance, each user-specific subfield (or user information field) may contain its own RU allocation information, which may be indicated by using the RU allocation subfield in ways described herein. Referring to FIG. 13, the seven bits B8~B2 may be used to indicate an RU index within a respective 80-MHz segment of a given bandwidth, and the two bits B1 B0 may be used to indicate or otherwise identify the respective 80-MHz segment of the given bandwidth in which RU allocation is located.

FIG. 14 illustrates an alternative example design 1400 in accordance with a proposed scheme in accordance with the present disclosure. Specifically, in the RU allocation table of design 1400, RU index may be labeled by grouping RUs/MRUs based on whether the allocation is within a single 80-MHz segment or across multiple 80-MHz segments. Referring to FIG. 14, entries in the upper portion of design 1400 may correspond to RUs/MRUs that are within a single 80-MHz segment. Moreover, entries in the lower portion of design 1400 may correspond to RUs/MRUs that are allocated in more than one 80-MHz segment and spanning across at least one boundary between two adjacent 80-MHz segments.

FIG. 15 illustrates still another alternative example design 1500 in accordance with a proposed scheme in accordance with the present disclosure. Specifically, in the RU allocation table of design 1500, RU index may be labeled by grouping RUs/MRUs according to the respective RU/MRU size. Referring to FIG. 15, entries in the upper portion of design 1500 may correspond to RUs/MRUs that are within a single 80-MHz segment. Moreover, entries in the lower portion of design 1500 may correspond to RUs/MRUs that are allocated in more than one 80-MHz segment and spanning across at least one boundary between two adjacent 80-MHz segments.

FIG. 16 illustrates yet another alternative example design 1600 in accordance with a proposed scheme in accordance with the present disclosure. In the RU allocation table of design 1600, the seven bits B8~B2 of the 9-bit RU allocation subfield may be arranged with different structured styles. In design 1600, for the MRU of MRU(3×996), two aggregations with the contiguous 3×996 may use the same value of B8~B2 but different values of B1 B0.

Illustrative Implementations

Figure 17:
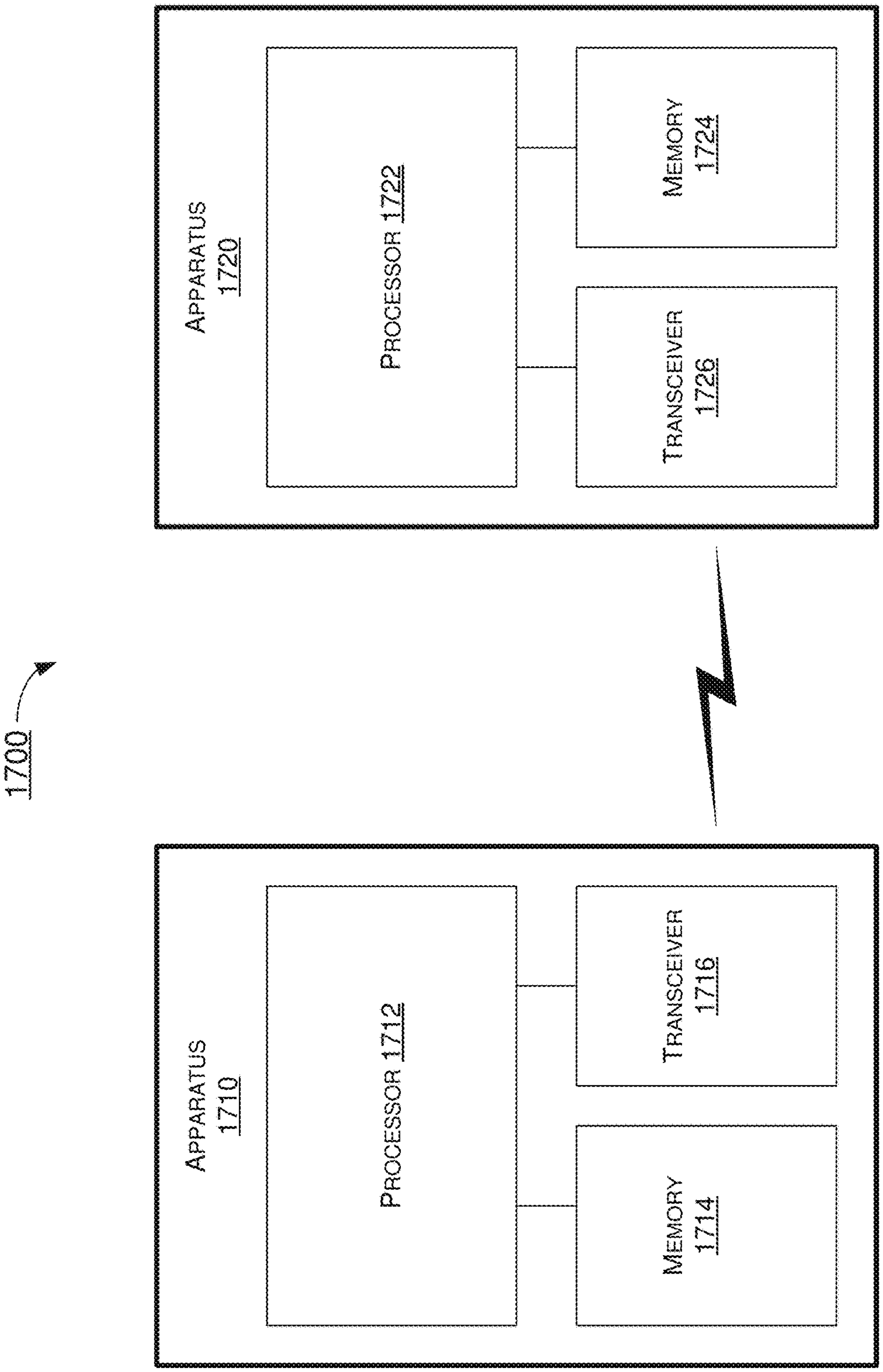
FIG. 17 is a block diagram of an example communication system in accordance with an implementation of the present disclosure.

FIG. 17 illustrates an example system 1700 having at least an example apparatus 1710 and an example apparatus 1720 in accordance with an implementation of the present disclosure. Each of apparatus 1710 and apparatus 1720 may perform various functions to implement schemes, techniques, processes and methods described herein pertaining to RU allocation subfield designs for trigger-based and self-contained signaling in EHT systems, including the various schemes described above with respect to various proposed designs, concepts, schemes, systems and methods described above as well as processes described below. For instance, apparatus 1710 may be implemented in STA 110 and apparatus 1720 may be implemented in STA 120, or vice versa.

Each of apparatus 1710 and apparatus 1720 may be a part of an electronic apparatus, which may be a STA or an AP, such as a portable or mobile apparatus, a wearable apparatus, a wireless communication apparatus or a computing apparatus. When implemented in a STA, each of apparatus 1710 and apparatus 1720 may be implemented in a smartphone, a smart watch, a personal digital assistant, a digital camera, or a computing equipment such as a tablet computer, a laptop computer or a notebook computer. Each of apparatus 1710 and apparatus 1720 may also be a part of a machine type apparatus, which may be an IoT apparatus such as an immobile or a stationary apparatus, a home apparatus, a wire communication apparatus or a computing apparatus. For instance, each of apparatus 1710 and apparatus 1720 may be implemented in a smart thermostat, a smart fridge, a smart door lock, a wireless speaker or a home control center. When implemented in or as a network apparatus, apparatus 1710 and/or apparatus 1720 may be implemented in a network node, such as an AP in a WLAN.

In some implementations, each of apparatus 1710 and apparatus 1720 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 1710 and apparatus 1720 may be implemented in or as a STA or an AP. Each of apparatus 1710 and apparatus 1720 may include at least some of those components shown in FIG. 17 such as a processor 1712 and a processor 1722, respectively, for example. Each of apparatus 1710 and apparatus 1720 may further include one or more other components not pertinent to the proposed scheme of the present disclosure (e.g., internal power supply, display device and/or user interface device), and, thus, such component(s) of apparatus 1710 and apparatus 1720 are neither shown in FIG. 17 nor described below in the interest of simplicity and brevity.

In one aspect, each of processor 1712 and processor 1722 may be implemented in the form of one or more single-core processors, one or more multi-core processors, one or more RISC processors or one or more CISC processors. That is, even though a singular term "a processor" is used herein to refer to processor 1712 and processor 1722, each of processor 1712 and processor 1722 may include multiple processors in some implementations and a single processor in other implementations in accordance with the present disclosure. In another aspect, each of processor 1712 and processor 1722 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 1712 and processor 1722 is a special-purpose machine specifically designed, arranged and configured to perform specific tasks including those pertaining to RU allocation subfield designs for trigger-based and self-contained signaling in EHT systems in accordance with various implementations of the present disclosure.

In some implementations, apparatus 1710 may also include a transceiver 1716 coupled to processor 1712. Transceiver 1716 may include a transmitter capable of wirelessly transmitting and a receiver capable of wirelessly receiving data. In some implementations, apparatus 1720 may also include a transceiver 1726 coupled to processor 1722. Transceiver 1726 may include a transmitter capable of wirelessly transmitting and a receiver capable of wirelessly receiving data. It is noteworthy that, although transceiver 1716 and transceiver 1726 are illustrated as being external to and separate from processor 1712 and processor 1722, respectively, in some implementations, transceiver 1716 may be an integral part of processor 1712 as a system on chip (SoC) and/or transceiver 1726 may be an integral part of processor 1722 as a SoC.

In some implementations, apparatus 1710 may further include a memory 1714 coupled to processor 1712 and capable of being accessed by processor 1712 and storing data therein. In some implementations, apparatus 1720 may further include a memory 1724 coupled to processor 1722 and capable of being accessed by processor 1722 and storing data therein. Each of memory 1714 and memory 1724 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 1714 and memory 1724 may include a type of read-only memory (ROM) such as mask ROM, programmable ROM (PROM), erasable programmable ROM (EPROM) and/or electrically erasable programmable ROM (EEPROM). Alternatively, or additionally, each of memory 1714 and memory 1724 may include a type of non-volatile random-access memory (NVRAM) such as flash memory, solid-state memory, ferroelectric RAM (FeRAM), magnetoresistive RAM (MRAM) and/or phase-change memory.

Each of apparatus 1710 and apparatus 1720 may be a communication entity capable of communicating with each other using various proposed schemes in accordance with the present disclosure. For illustrative purposes and without limitation, a description of capabilities of apparatus 1710, as STA 110, and apparatus 1720, as STA 120, is provided below. It is noteworthy that, although a detailed description of capabilities, functionalities and/or technical features of apparatus 1710 is provided below, the same may be applied to apparatus 1720 although a detailed description thereof is not provided solely in the interest of brevity. It is also noteworthy that, although the example implementations described below are provided in the context of WLAN, the same may be implemented in other types of networks.

Under a proposed scheme pertaining to RU allocation subfield designs for trigger-based and self-contained signaling in EHT systems in accordance with the present disclosure, with apparatus 1710 implemented in or as STA 110 and apparatus 1720 implemented in or as STA 120 in network environment 100, processor 1712 of apparatus 1710 may receive, via transceiver 1716, a signaling (e.g., from apparatus 1720 as STA 120). Additionally, processor 1712 may determining allocation of one or more RUs according to a 9-bit RU allocation subfield indicated in the signaling. Moreover, processor 1712 may perform, via transceiver 1716, wireless communications using the one or more RUs.

In some implementations, in receiving the signaling, processor 1712 may receive a trigger frame. Moreover, in performing the wireless communications, processor 1712 may perform an UL transmission using the one or more RUs responsive to receiving the trigger frame.

In some implementations, in determining allocation of the one or more RUs according to the 9-bit RU allocation subfield, processor 1712 may determine allocation of the one or more RUs in a bandwidth up to a 320-MHz bandwidth according to the 9-bit RU allocation subfield in an RU allocation table which indicates single RUs of different sizes and a plurality of aggregations of multiple RUs. Alternatively, one of the two least significant bits (e.g., B1) may be used to indicate which of two 80-MHz segments the RU/MRU is allocated in a 160-MHz bandwidth/segment, and the other one of the two least significant bits (e.g., B0) may be used to indicate which of two 160-MHz segments the RU/MRU is allocated in a 320-MHz bandwidth.

In some implementations, the RU allocation table may include a first plurality of entries and a second plurality of entries. For instance, the first plurality of entries may correspond to RU allocation as defined in the IEEE 802.11ax specification, and the second plurality of entries may correspond to RU allocation as defined in the IEEE 802.11 be specification.

In some implementations, two least significant bits of the 9-bit RU allocation subfield may indicate in which one or more of up to four 80-MHz segments of a bandwidth up to a 320-MHz bandwidth the one or more RUs are allocated. In such cases, in an event that a total size of the one or more RUs is equal to or less than 996 tones: (a) a decimal value of 0 of the two least significant bits may indicate allocation of the one or more RUs in a 20/40/80-MHz bandwidth, or in a first 80-MHz segment of the 160/320-MHz bandwidth, (b) a decimal value of 1 of the two least significant bits may indicate allocation of the one or more RUs in a second 80-MHz segment of the 160/320-MHz bandwidth, (c) a decimal value of 2 of the two least significant bits may indicate allocation of the one or more RUs in a third 80-MHz segment of the 320-MHz bandwidth, and (d) a decimal value of 3 of the two least significant bits may indicate allocation of the one or more RUs in a fourth 80-MHz segment of the 320-MHz bandwidth. Moreover, in an event that a total size of the one or more RUs is greater than 996 tones: (e) a decimal value of 1 of the two least significant bits may indicate allocation of the one or more RUs across a boundary between a first 80-MHz segment and a second 80-MHz segment of the 160/320-MHz bandwidth and within a first 160-MHz segment of the 320-MHz bandwidth, (f) a decimal value of 2 of the two least significant bits may indicate allocation of the one or more RUs across a boundary between a second 80-MHz segment and a third 80-MHz segment of the 320-MHz bandwidth and within a first 240-MHz segment of the 320-MHz bandwidth, and (g) a decimal value of 3 of the two least significant bits may indicate allocation of the one or more RUs across a boundary between a third 80-MHz segment and a fourth 80-MHz segment of the 320-MHz bandwidth.

In some implementations, seven most significant bits of the 9-bit RU allocation subfield may indicate a size and indexing of the one or more RUs in an RU allocation table. In such cases: (a) a decimal value in a range of 0~68 of the seven most significant bits may indicate an entry in the RU allocation table corresponding to a single RU per 80-MHz frequency segment, (b) a decimal value of 68 of the seven most significant bits may indicate an entry in the RU allocation table corresponding to two contiguous RUs each of a size of 996 tones in a 160-MHz bandwidth, or in a 160-MHz frequency segment of the 320-MHz bandwidth, (c) a decimal value of 119 of the seven most significant bits may indicate an entry in the RU allocation table corresponding to a single RU with four contiguous RUs each of a size of 996 tones, (d) a decimal value in a range of 69~118 of the seven most significant bits may indicate an entry in the RU allocation table corresponding to an aggregation of multiple RUs, (e) a decimal value in a range of 69~74 of the seven most significant bits may indicate an entry in the RU allocation table corresponding to an aggregation of one RU of 26 tones (RU26) and one RU of 52 tones (RU52) in a 20/40/80-MHz bandwidth, or in a 80-MHz frequency segment, (f) a decimal value in a range of 75~82 of the seven most significant bits may indicate an entry in the RU allocation table corresponding to an aggregation of one RU of 26 tones (RU26) and one RU of 106 tones (RU106) in a 20/40/80-MHz bandwidth, or in a 80-MHz frequency segment, (g) a decimal value in a range of 83~86 of the seven most significant bits may indicate an entry in the RU allocation table corresponding to an aggregation of one RU of 242 tones (RU242) and one RU of 484 tones (RU484) in the 80-MHzbandwidth or in a 80-MHz frequency segment, (h) a decimal value in a range of 87~90 of the seven most significant bits may indicate an entry in the RU allocation table corresponding to an aggregation of one RU of 484 tones (RU484) and one RU of 996 tones (RU996) in the 160-MHz bandwidth or in a 160-MHz frequency segment, (i) a decimal value in a range of 91~98 of the seven most significant bits may indicate an entry in the RU allocation table corresponding to an aggregation of one RU of 242 tones (RU242), one RU of 484 tones (RU484) and one RU of 996 tones (RU996) in the 160-MHz bandwidth or in a 160-MHz frequency segment, (j) a decimal value in a range of 99~100 of the seven most significant bits may indicate an entry in the RU allocation table corresponding to an aggregation of two RUs each of 996 tones (2×RU996) in a 240-MHz frequency segment, (k) a decimal value in a range of 101~106 of the seven most significant bits may indicate an entry in the RU allocation table corresponding to an aggregation of one RU of 484 tones (RU484) and two RUs each of 996 tones (2×RU996) in a 240-MHz frequency segment, (I) a decimal value in a range of 107~110 of the seven most significant bits may indicate an entry in the RU allocation table corresponding to an aggregation of three RUs each of 996 tones (3×RU996) in the 320-MHz bandwidth, and (m) a decimal value in a range of 111~118 of the seven most significant bits may indicate an entry in the RU allocation table corresponding to an aggregation of one RU of 484 tones (RU484) and three RUs each of 996 tones (3×RU996) in the 320-MHz bandwidth.

Illustrative Processes

Figure 18:
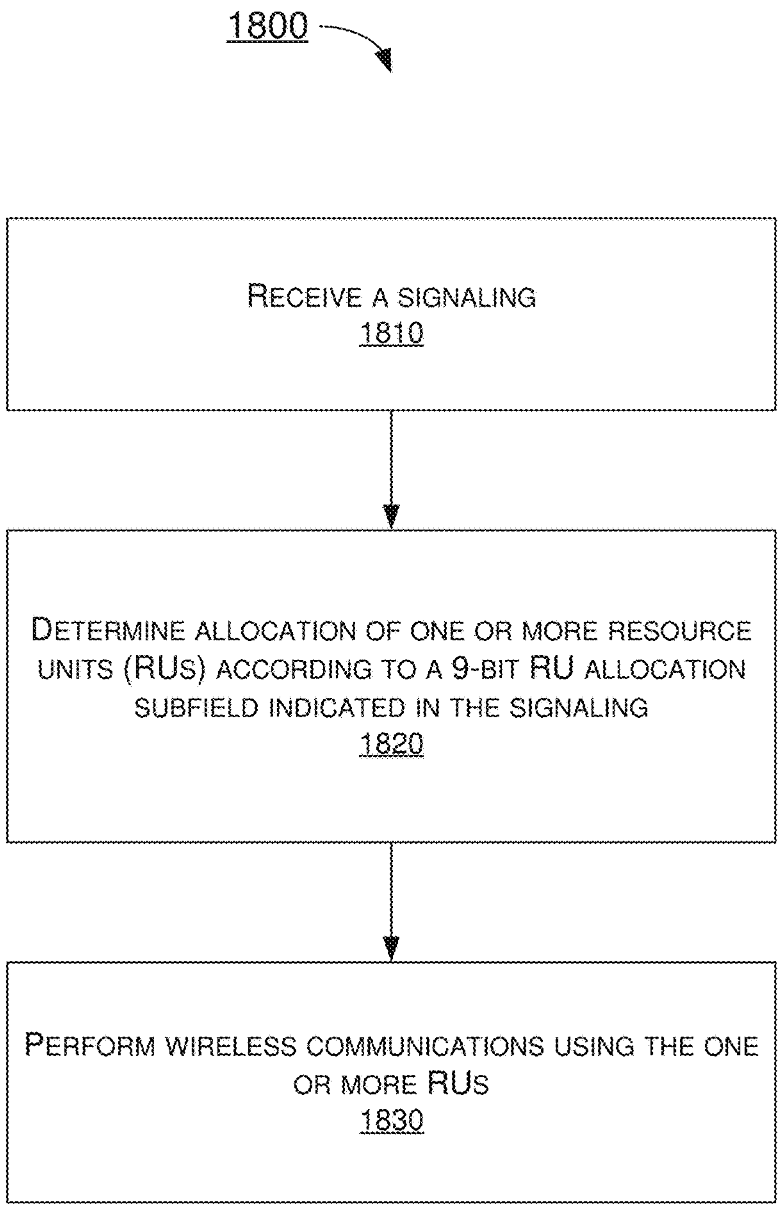
FIG. 18 is a flowchart of an example process in accordance with an implementation of the present disclosure.

FIG. 18 illustrates an example process 1800 in accordance with an implementation of the present disclosure. Process 1800 may represent an aspect of implementing various proposed designs, concepts, schemes, systems and methods described above. More specifically, process 1800 may represent an aspect of the proposed concepts and schemes pertaining to RU allocation subfield designs for trigger-based and self-contained signaling in EHT systems in accordance with the present disclosure. Process 1800 may include one or more operations, actions, or functions as illustrated by one or more of blocks 1810, 1820 and 1830. Although illustrated as discrete blocks, various blocks of process 1800 may be divided into additional blocks, combined into fewer blocks, or eliminated, depending on the desired implementation. Moreover, the blocks/sub-blocks of process 1800 may be executed in the order shown in FIG. 18 or, alternatively in a different order. Furthermore, one or more of the blocks/sub-blocks of process 1800 may be executed repeatedly or iteratively. Process 1800 may be implemented by or in apparatus 1710 and apparatus 1720 as well as any variations thereof. Solely for illustrative purposes and without limiting the scope, process 1800 is described below in the context of apparatus 1710 implemented in or as STA 110 and apparatus 1720 implemented in or as STA 120 of a wireless network such as a WLAN in network environment 180 in accordance with one or more of IEEE 802.11 standards. Process 1800 may begin at block 1810.

At 1810, process 1800 may involve processor 1712 of apparatus 1710 (e.g., STA 110) receiving, via transceiver 1716, a signaling (e.g., from apparatus 1720 as STA 120). Process 1800 may proceed from 1810 to 1820.

At 1820, process 1800 may involve processor 1712 determining allocation of one or more RUs according to a 9-bit RU allocation subfield indicated in the signaling. Process 1800 may proceed from 1820 to 1830.

At 1830, process 1800 may involve processor 1712 performing, via transceiver 1716, wireless communications using the one or more RUs.

In some implementations, in receiving the signaling, process 1800 may involve processor 1712 receiving a trigger frame. Moreover, in performing the wireless communications, process 1800 may involve processor 1712 performing an UL transmission using the one or more RUs responsive to receiving the trigger frame.

In some implementations, in determining allocation of the one or more RUs according to the 9-bit RU allocation subfield, process 1800 may involve processor 1712 determining allocation of the one or more RUs in a bandwidth up to a 320-MHz bandwidth (e.g., which could be a 20-MHz bandwidth, a 40-MHz bandwidth, a 80-MHz bandwidth, a 160-MHz bandwidth or a 320-MHz bandwidth) according to the 9-bit RU allocation subfield in an RU allocation table which indicates single RUs of different sizes and a plurality of aggregations of multiple RUs.

In some implementations, the RU allocation table may include a first plurality of entries and a second plurality of entries. For instance, the first plurality of entries may correspond to RU allocation as defined in the IEEE 802.11ax specification, and the second plurality of entries may correspond to RU allocation as defined in the IEEE 802.11be specification.

In some implementations, two least significant bits of the 9-bit RU allocation subfield may indicate in which one or more of up to four 80-MHz segments of a bandwidth up to a 320-MHz bandwidth the one or more RUs are allocated. Alternatively, one of the two least significant bits (e.g., B1) may be used to indicate which of two 80-MHz segments the RU/MRU is allocated in a 160-MHz bandwidth/segment, and the other one of the two least significant bits (e.g., B0) may be used to indicate which of two 160-MHz segments the RU/MRU is allocated in a 320-MHz bandwidth.

In some implementations, in an event that a total size of the one or more RUs is equal to or less than 996 tones: (a) a decimal value of 0 of the two least significant bits may indicate allocation of the one or more RUs in a 20/40/80-MHz bandwidth, or in a first 80-MHz segment of the 160/320-MHz bandwidth, (b) a decimal value of 1 of the two least significant bits may indicate allocation of the one or more RUs in a second 80-MHz segment of the 160/320-MHz bandwidth, (c) a decimal value of 2 of the two least significant bits may indicate allocation of the one or more RUs in a third 80-MHz segment of the 320-MHz bandwidth, and (d) a decimal value of 3 of the two least significant bits may indicate allocation of the one or more RUs in a fourth 80-MHz segment of the 320-MHz bandwidth.

In some implementations, in an event that a total size of the one or more RUs is greater than 996 tones: (e) a decimal value of 1 of the two least significant bits may indicate allocation of the one or more RUs across a boundary between a first 80-MHz segment and a second 80-MHz segment of the 160/320-MHz bandwidth and within a first 160-MHz segment of the 320-MHz bandwidth, (f) a decimal value of 2 of the two least significant bits may indicate allocation of the one or more RUs across a boundary between a second 80-MHz segment and a third 80-MHz segment of the 320-MHz bandwidth and within a first 240-MHz segment of the 320-MHz bandwidth, and (g) a decimal value of 3 of the two least significant bits may indicate allocation of the one or more RUs across a boundary between a third 80-MHz segment and a fourth 80-MHz segment of the 320-MHz bandwidth.

In some implementations, seven most significant bits of the 9-bit RU allocation subfield may indicate a size and indexing of the one or more RUs in an RU allocation table.

In some implementations, a decimal value in a range of 0~68 of the seven most significant bits may indicate an entry in the RU allocation table corresponding to a single RU in a 20/40/80-MHz bandwidth or in a 80-MHz segment of a 160/320-MHz bandwidth, and a decimal value of 68 of the seven most significant bits may indicate an entry in the RU allocation table corresponding to two contiguous RUs each of a size of 996 tones in the 160-MHz bandwidth or in a 160-MHz segment of the 320-MHz bandwidth.

In some implementations, a decimal value of 119 of the seven most significant bits may indicate an entry in the RU allocation table corresponding to a single RU, corresponding to four contiguous RUs each of a size of 996 tones in the 320-MHz bandwidth.

In some implementations, a decimal value in a range of 69~118 of the seven most significant bits may indicate an entry in the RU allocation table corresponding to an aggregation of multiple RUs.

In some implementations, a decimal value in a range of 69~74 of the seven most significant bits may indicate an entry in the RU allocation table corresponding to an aggregation of one RU of 26 tones (RU26) and one RU of 52 tones (RU52) in a 20/40/80-MHz bandwidth, or in a 80-MHz frequency segment of the 160/320-MHz bandwidth.

In some implementations, a decimal value in a range of 75~82 of the seven most significant bits may indicate an entry in the RU allocation table corresponding to an aggregation of one RU of 26 tones (RU26) and one RU of 106 tones (RU52) in a 20/40/80-MHz bandwidth, or in a 80-MHz frequency segment of the 160/320-MHz bandwidth.

In some implementations, a decimal value in a range of 83~86 of the seven most significant bits may indicate an entry in the RU allocation table corresponding to an aggregation of one RU of 242 tones (RU242) and one RU of 484 tones (RU484) in 80 MHz bandwidth, or in a 80 MHz frequency segment of the 160/320 MHz bandwidth.

In some implementations, a decimal value in a range of 87~90 of the seven most significant bits may indicate an entry in the RU allocation table corresponding to an aggregation of one RU of 484 tones (RU484) and one RU of 996 tones (RU996) in a 160-MHz bandwidth, or in a 160-MHz frequency segment of the 320-MHz bandwidth.

In some implementations, a decimal value in a range of 91~98 of the seven most significant bits may indicate an entry in the RU allocation table corresponding to an aggregation of one RU of 242 tones (RU242), one RU of 484 tones (RU484) and one RU of 996 tones (RU996) in a 160-MHz bandwidth, or in a 160-MHz frequency segment of the 320-MHz bandwidth.

In some implementations, a decimal value in a range of 99~100 of the seven most significant bits may indicate an entry in the RU allocation table corresponding to an aggregation of two RUs each of 996 tones (2×RU996) in a 240-MHz frequency segment of the 320-MHz bandwidth.

In some implementations, a decimal value in a range of 101~106 of the seven most significant bits may indicate an entry in the RU allocation table corresponding to an aggregation of one RU of 484 tones (RU484) and two RUs each of 996 tones (2×RU996) in a 240-MHz frequency segment of the 320-MHz bandwidth.

In some implementations, a decimal value in a range of 107~110 of the seven most significant bits may indicate an entry in the RU allocation table corresponding to an aggregation of three RUs each of 996 tones (3×RU996) in the 320-MHz bandwidth.

In some implementations, a decimal value in a range of 111~118 of the seven most significant bits may indicate an entry in the RU allocation table corresponding to an aggregation of one RU of 484 tones (RU484) and three RUs each of 996 tones (3×RU996) in the 320-MHz bandwidth.

Figure 19:
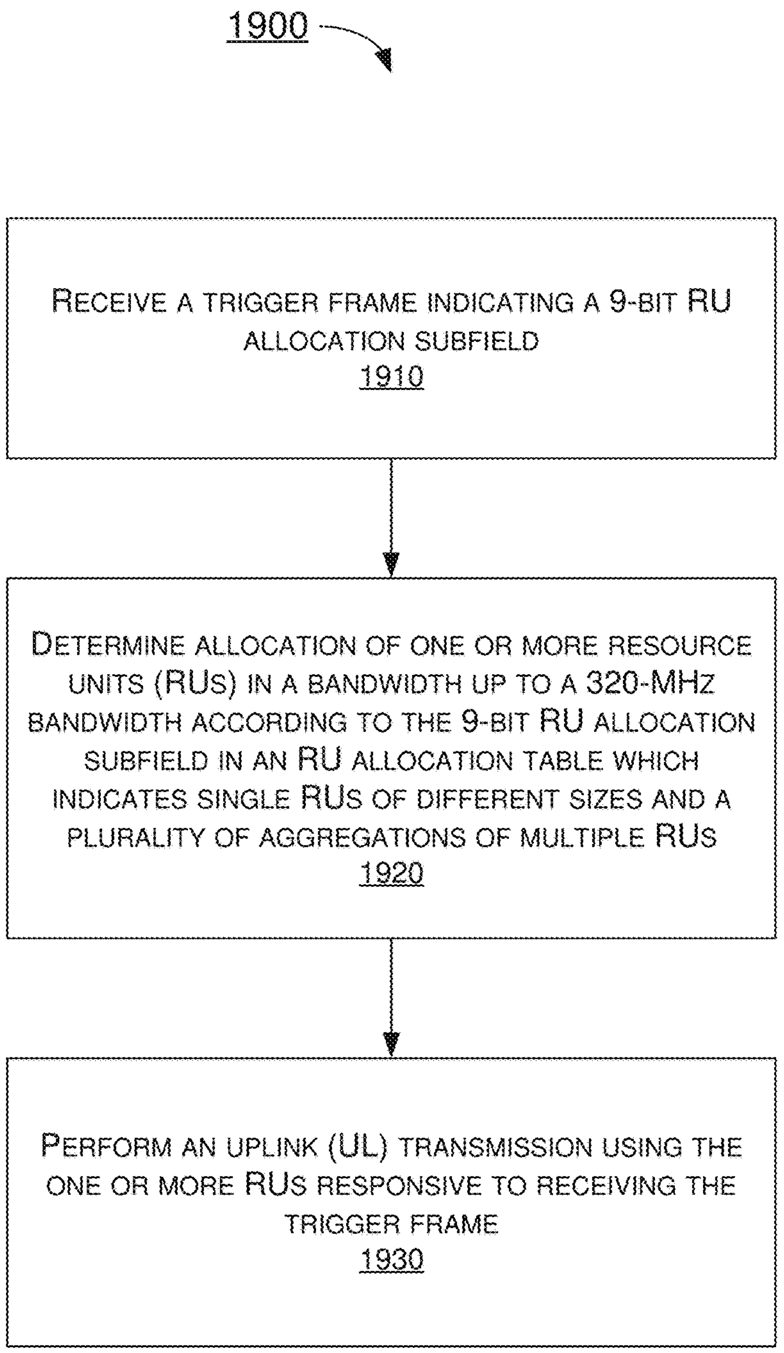
FIG. 19 is a flowchart of an example process in accordance with an implementation of the present disclosure.

FIG. 19 illustrates an example process 1900 in accordance with an implementation of the present disclosure. Process 1900 may represent an aspect of implementing various proposed designs, concepts, schemes, systems and methods described above. More specifically, process 1900 may represent an aspect of the proposed concepts and schemes pertaining to RU allocation subfield designs for trigger-based and self-contained signaling in EHT systems in accordance with the present disclosure. Process 1900 may include one or more operations, actions, or functions as illustrated by one or more of blocks 1910, 1920 and 1930. Although illustrated as discrete blocks, various blocks of process 1900 may be divided into additional blocks, combined into fewer blocks, or eliminated, depending on the desired implementation. Moreover, the blocks/sub-blocks of process 1900 may be executed in the order shown in FIG. 19 or, alternatively in a different order. Furthermore, one or more of the blocks/sub-blocks of process 1900 may be executed repeatedly or iteratively. Process 1900 may be implemented by or in apparatus 1710 and apparatus 1720 as well as any variations thereof. Solely for illustrative purposes and without limiting the scope, process 1900 is described below in the context of apparatus 1710 implemented in or as STA 110 and apparatus 1720 implemented in or as STA 120 of a wireless network such as a WLAN in network environment 190 in accordance with one or more of IEEE 802.11 standards. Process 1900 may begin at block 1910.

At 1910, process 1900 may involve processor 1712 of apparatus 1710 (e.g., STA 110) receiving, via transceiver 1716, a trigger frame indicating a 9-bit RU allocation subfield (e.g., from apparatus 1720 as STA 120). Process 1900 may proceed from 1910 to 1920.

At 1920, process 1900 may involve processor 1712 determining allocation of one or more RUs in a bandwidth up to a 320-MHz bandwidth (e.g., which could be a 20-MHz bandwidth, a 40-MHz bandwidth, a 80-MHz bandwidth, a 160-MHz bandwidth or a 320-MHz bandwidth) according to the 9-bit RU allocation subfield in an RU allocation table which indicates single RUs of different sizes and a plurality of aggregations of multiple RUs. Process 1900 may proceed from 1920 to 1930.

At 1930, process 1900 may involve processor 1712 performing, via transceiver 1716, an UL transmission using the one or more RUs responsive to receiving the trigger frame.

In some implementations, two least significant bits of the 9-bit RU allocation subfield may indicate in which one or more of up to four 80-MHz segments of a bandwidth up to a 320-MHz bandwidth the one or more RUs are allocated. In such cases, in an event that a total size of the one or more RUs is equal to or less than 996 tones: (a) a decimal value of 0 of the two least significant bits may indicate allocation of the one or more RUs in the 20/40/80-MHz bandwidth, or in a first 80-MHz segment of the 160/320-MHz bandwidth, (b) a decimal value of 1 of the two least significant bits may indicate allocation of the one or more RUs in a second 80-MHz segment of the 160/320-MHz bandwidth, (c) a decimal value of 2 of the two least significant bits may indicate allocation of the one or more RUs in a third 80-MHz segment of the 320-MHz bandwidth, and (d) a decimal value of 3 of the two least significant bits may indicate allocation of the one or more RUs in a fourth 80-MHz segment of the 320-MHz bandwidth. Moreover, in an event that a total size of the one or more RUs is greater than 996 tones: (e) a decimal value of 1 of the two least significant bits may indicate allocation of the one or more RUs across a boundary between a first 80-MHz segment and a second 80-MHz segment of the 160/320-MHz bandwidth and within a first 160-MHz segment of the 320-MHz bandwidth, (f) a decimal value of 2 of the two least significant bits may indicate allocation of the one or more RUs across a boundary between a second 80-MHz segment and a third 80-MHz segment of the 320-MHz bandwidth and within a first 240-MHz segment of the 320-MHz bandwidth, and (g) a decimal value of 3 of the two least significant bits may indicate allocation of the one or more RUs across a boundary between a third 80-MHz segment and a fourth 80-MHz segment of the 320-MHz bandwidth.

In some implementations, seven most significant bits of the 9-bit RU allocation subfield may indicate a size and indexing of the one or more RUs in an RU allocation table. In such cases: (a) a decimal value in a range of 0~68 of the seven most significant bits may indicate an entry in the RU allocation table corresponding to a single RU in a 20/40/80-MHz bandwidth, or in a 80-MHz frequency segment of the 160/320-MHz bandwidth, (b) a decimal value of 68 of the seven most significant bits may indicate an entry in the RU allocation table corresponding to two contiguous RUs each of a size of 996 tones in a 160-MHz bandwidth, or in a 160-MHz frequency segment of the 320-MHz bandwidth, (c) a decimal value of 119 of the seven most significant bits may indicate an entry in the RU allocation table corresponding to a single RU with four contiguous RUs each of a size of 996 tones in the 320-MHz bandwidth, (d) a decimal value in a range of 69~118 of the seven most significant bits may indicate an entry in the RU allocation table corresponding to an aggregation of multiple RUs, (e) a decimal value in a range of 69~74 of the seven most significant bits may indicate an entry in the RU allocation table corresponding to an aggregation of one RU of 26 tones (RU26) and one RU of 52 tones (RU52) in a 20/40/80-MHz bandwidth, or in a 80-MHz frequency segment of the 160/320-MHz bandwidth, (f) a decimal value in a range of 75~82 of the seven most significant bits may indicate an entry in the RU allocation table corresponding to an aggregation of one RU of 26 tones (RU26) and one RU of 106 tones (RU106) in a 20/40/80-MHz bandwidth, or in a 80-MHz frequency segment of the 160/320-MHz bandwidth, (g) a decimal value in a range of 83~86 of the seven most significant bits may indicate an entry in the RU allocation table corresponding to an aggregation of one RU of 242 tones (RU242) and one RU of 484 tones (RU484) in the 80-MHz bandwidth, or in a 80-MHz frequency segment of the 160/320-MHz bandwidth, (h) a decimal value in a range of 87~90 of the seven most significant bits may indicate an entry in the RU allocation table corresponding to an aggregation of one RU of 484 tones (RU484) and one RU of 996 tones (RU996) in the 160-MHz bandwidth, or in a 160-MHz frequency segment of the 320-MHz bandwidth, (i) a decimal value in a range of 91~98 of the seven most significant bits may indicate an entry in the RU allocation table corresponding to an aggregation of one RU of 242 tones (RU242), one RU of 484 tones (RU484) and one RU of 996 tones (RU996) in the 160-MHz bandwidth, or in a 160-MHz frequency segment of the 320-MHz bandwidth, (j) a decimal value in a range of 99~100 of the seven most significant bits may indicate an entry in the RU allocation table corresponding to an aggregation of two RUs each of 996 tones (2×RU996) in a 240-MHz frequency segment of the 320-MHz bandwidth, (k) a decimal value in a range of 101~106 of the seven most significant bits may indicate an entry in the RU allocation table corresponding to an aggregation of one RU of 484 tones (RU484) and two RUs each of 996 tones (2×RU996) in a 240-MHz frequency segment of the 320-MHz bandwidth, (I) a decimal value in a range of 107~110 of the seven most significant bits may indicate an entry in the RU allocation table corresponding to an aggregation of three RUs each of 996 tones (3×RU996) in the 320-MHz bandwidth, and (m) a decimal value in a range of 111~118 of the seven most significant bits may indicate an entry in the RU allocation table corresponding to an aggregation of one RU of 484 tones (RU484) and three RUs each of 996 tones (3×RU996) in the 320-MHz bandwidth.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:

receiving a signaling;

determining allocation of single or multiple resource units (RUs) according to a 9-bit RU allocation subfield indicated in the signaling; and performing wireless communications using the single or multiple RUs, wherein:

a decimal value in a range of 0~68 of seven bits of the 9-bit RU allocation subfield indicates an entry in the RU allocation table corresponding to a single RU of 26-tones, 52-tones, 106-tones, 242-tones, 484-tones and 996-tones; or a decimal value larger than 68 of the seven bits of the 9-bit RU allocation subfield indicates another entry in the RU allocation table corresponding to a multi-RU (MRU) of (52+26)-tones, (106+26)-tones, (484+242)-tones, (996+484)-tones, (996+484+242)-tones, (2×996+484)-tones, (3×996+484)-tones, (2×996)-tones, (3×996)-tones and RU (4×996)-tones.

2. The method of claim 1, wherein the receiving of the signaling comprises receiving a trigger frame, and wherein the performing of the wireless communications comprises performing an uplink (UL) transmission using the one or more RUs responsive to receiving the trigger frame.

3. The method of claim 1, wherein the determining of allocation of the one or more RUs according to the 9-bit RU allocation subfield comprises determining allocation of the one or more RUs in a 20/40/80/160/320-MHz bandwidth according to the 9-bit RU allocation subfield in an RU allocation table which indicates single RUs of different sizes and a plurality of aggregations of multiple RUs, wherein the RU allocation table comprises a first plurality of entries and a second plurality of entries, wherein the first plurality of entries correspond to RU allocation as defined in an Institute of Electrical and Electronics Engineers (IEEE) 802.11ax specification, and wherein the second plurality of entries correspond to allocation of RUs or MURs as defined in an IEEE 802.11be specification.

4. The method of claim 1, wherein one of two least significant bits of the 9-bit RU allocation subfield indicates which of two 80-MHz segments the one or more RUs are allocated in a 160-MHz bandwidth or segment, and wherein another one of the two least significant bits of the 9-bit RU allocation subfield indicates which of two 160-MHz segments the one or more RUs are allocated in a 320-MHz bandwidth.

5. The method of claim 1, wherein two least significant bits of the 9-bit RU allocation subfield indicate in which one or more of up to four 80-MHz segments of a bandwidth up to a 320-MHz bandwidth the one or more RUs are allocated.

6. The method of claim 5, wherein, in an event that a total size of the one or more RUs is equal to or less than 996 tones:

a decimal value of 0 of the two least significant bits indicates allocation of the one or more RUs in a 20 or 40 or 80 MHz bandwidth, or in a first 80-MHz segment of a 160-MHz bandwidth or the 320-MHz bandwidth, a decimal value of 1 of the two least significant bits indicates allocation of the one or more RUs in a second 80-MHz segment of the 160 or 320-MHz bandwidth, a decimal value of 2 of the two least significant bits indicates allocation of the one or more RUs in a third 80-MHz segment of the 320-MHz bandwidth, and a decimal value of 3 of the two least significant bits indicates allocation of the one or more RUs in a fourth 80-MHz segment of the 320-MHz bandwidth.

7. The method of claim 5, wherein, in an event that a total size of the one or more RUs is greater than 996 tones:

a decimal value of 1 of the two least significant bits indicates allocation of the one or more RUs across a boundary between a first 80-MHz segment and a second 80-MHz segment of the 160 or 320-MHz bandwidth and within a first 160-MHz segment of the 320-MHz bandwidth, a decimal value of 2 of the two least significant bits indicates allocation of the one or more RUs across a boundary between a second 80-MHz segment and a third 80-MHz segment of the 320-MHz bandwidth and within a first 240-MHz segment of the 320-MHz bandwidth, and a decimal value of 3 of the two least significant bits indicates allocation of the one or more RUs across a boundary between a third 80-MHz segment and a fourth 80-MHz segment of the 320-MHz bandwidth.

8. The method of claim 1, wherein the seven bits of the 9-bit RU allocation subfield comprise seven most significant bits of the 9-bit RU allocation subfield that indicate a size and indexing of the one or more RUs in an RU allocation table.

9. The method of claim 8, wherein a decimal value in a range of 0~68 of the seven most significant bits indicates an entry in the RU allocation table corresponding to a single RU, and wherein a decimal value of 68 of the seven most significant bits indicates an entry in the RU allocation table corresponding to two contiguous RUs each of a size of 996 tones.

10. The method of claim 8, wherein a decimal value of 119 of the seven most significant bits indicates an entry in the RU allocation table corresponding to a single RU with four contiguous RUs each of a size of 996 tones.

11. The method of claim 8, wherein a decimal value in a range of 69~118 of the seven most significant bits indicates an entry in the RU allocation table corresponding to an aggregation of multiple RUs.

12. The method of claim 8, wherein a decimal value in a range of 69~74 of the seven most significant bits indicates an entry in the RU allocation table corresponding to an aggregation of one RU of 26 tones (RU26) and one RU of 52 tones (RU52).

13. The method of claim 8, wherein a decimal value in a range of 75~82 of the seven most significant bits indicates an entry in the RU allocation table corresponding to an aggregation of one RU of 26 tones (RU26) and one RU of 106 tones (RU106).

14. The method of claim 8, wherein a decimal value in a range of 83~86 of the seven most significant bits indicates an entry in the RU allocation table corresponding to an aggregation of one RU of 242 tones (RU242) and one RU of 484 tones (RU484).

15. The method of claim 8, wherein a decimal value in a range of 87~90 of the seven most significant bits indicates an entry in the RU allocation table corresponding to an aggregation of one RU of 484 tones (RU484) and one RU of 996 tones (RU996).

16. The method of claim 8, wherein a decimal value in a range of 91~98 of the seven most significant bits indicates an entry in the RU allocation table corresponding to an aggregation of one RU of 242 tones (RU242), one RU of 484 tones (RU484) and one RU of 996 tones (RU996).

17. The method of claim 8, wherein a decimal value in a range of 99~100 of the seven most significant bits indicates an entry in the RU allocation table corresponding to an aggregation of two RUs each of 996 tones (2×RU996).

18. The method of claim 8, wherein a decimal value in a range of 101~106 of the seven most significant bits indicates an entry in the RU allocation table corresponding to an aggregation of one RU of 484 tones (RU484) and two RUs each of 996 tones (2×RU996).

19. The method of claim 8, wherein a decimal value in a range of 107~110 of the seven most significant bits indicates an entry in the RU allocation table corresponding to an aggregation of three RUs each of 996 tones (3×RU996).

20. The method of claim 8, wherein a decimal value in a range of 111~118 of the seven most significant bits indicates an entry in the RU allocation table corresponding to an aggregation of one RU of 484 tones (RU484) and three RUs each of 996 tones (3×RU996).

21. A method, comprising:

receiving a trigger frame indicating a 9-bit RU allocation subfield;

determining allocation of one or more resource units (RUs) in a bandwidth up to a 320-MHz bandwidth according to the 9-bit RU allocation subfield in an RU allocation table which indicates single RUs of different sizes and a plurality of aggregations of multiple RUs; and performing an uplink (UL) transmission using the one or more RUs responsive to receiving the trigger frame, wherein:

a decimal value in a range of 0~68 of seven bits of the 9-bit RU allocation subfield indicates an entry in the RU allocation table corresponding to a single RU of 26-tones, 52-tones, 106-tones, 242-tones, 484-tones and 996-tones; or a decimal value larger than 68 of the seven bits of the 9-bit RU allocation subfield indicates another entry in the RU allocation table corresponding to a multi-RU (MRU) of (52+26)-tones, (106+26)-tones, (484+242)-tones, (996+484)-tones, (996+484+242)-tones, (2×996+484)-tones, (3×996+484)-tones, (2×996)-tones, (3×996)-tones and RU (4×996)-tones.

22. The method of claim 21, wherein two least significant bits of the 9-bit RU allocation subfield indicate in which one or more of up to four 80-MHz segments of the bandwidth up to a 320-MHz bandwidth the one or more RUs are allocated, and wherein:

in an event that a total size of the one or more RUs is equal to or less than 996 tones:

a decimal value of 0 of the two least significant bits indicates allocation of the one or more RUs in a 20 or 40 or 80-MHz bandwidth, or in a first 80-MHz segment of a 160-MHz bandwidth or the 320-MHz bandwidth, a decimal value of 1 of the two least significant bits indicates allocation of the one or more RUs in a second 80-MHz segment of the 160 or 320-MHz bandwidth, a decimal value of 2 of the two least significant bits indicates allocation of the one or more RUs in a third 80-MHz segment of the 320-MHz bandwidth, and a decimal value of 3 of the two least significant bits indicates allocation of the one or more RUs in a fourth 80-MHz segment of the 320-MHz bandwidth, in an event that a total size of the one or more RUs is greater than 996 tones:

a decimal value of 1 of the two least significant bits indicates allocation of the one or more RUs across a boundary between a first 80-MHz segment and a second 80-MHz segment of the 160 or 320-MHz bandwidth and within a first 160-MHz segment of the 320-MHz bandwidth, a decimal value of 2 of the two least significant bits indicates allocation of the one or more RUs across a boundary between a second 80-MHz segment and a third 80-MHz segment of the 320-MHz bandwidth and within a first 240-MHz segment of the 320-MHz bandwidth, and a decimal value of 3 of the two least significant bits indicates allocation of the one or more RUs across a boundary between a third 80-MHz segment and a fourth 80-MHz segment of the 320-MHz bandwidth.

23. The method of claim 21, wherein seven most significant bits of the 9-bit RU allocation subfield indicate a size and indexing of the one or more RUs in an RU allocation table, and wherein:

a decimal value in a range of 0~68 of the seven most significant bits indicates an entry in the RU allocation table corresponding to a single RU, a decimal value of 68 of the seven most significant bits indicates an entry in the RU allocation table corresponding to two contiguous RUs each of a size of 996 tones, a decimal value of 119 of the seven most significant bits indicates an entry in the RU allocation table corresponding to a single RU with four contiguous RUs each of a size of 996 tones, a decimal value in a range of 69~118 of the seven most significant bits indicates an entry in the RU allocation table corresponding to an aggregation of multiple RUs, a decimal value in a range of 69~74 of the seven most significant bits indicates an entry in the RU allocation table corresponding to an aggregation of one RU of 26 tones (RU26) and one RU of 52 tones (RU52), a decimal value in a range of 75~82 of the seven most significant bits indicates an entry in the RU allocation table corresponding to an aggregation of one RU of 26 tones (RU26) and one RU of 106 tones (RU106), a decimal value in a range of 83~86 of the seven most significant bits indicates an entry in the RU allocation table corresponding to an aggregation of one RU of 242 tones (RU242) and one RU of 484 tones (RU484), a decimal value in a range of 87~90 of the seven most significant bits indicates an entry in the RU allocation table corresponding to an aggregation of one RU of 484 tones (RU484) and one RU of 996 tones (RU996), a decimal value in a range of 91~98 of the seven most significant bits indicates an entry in the RU allocation table corresponding to an aggregation of one RU of 242 tones (RU242), one RU of 484 tones (RU484) and one RU of 996 tones (RU996), a decimal value in a range of 99~100 of the seven most significant bits indicates an entry in the RU allocation table corresponding to an aggregation of two RUs each of 996 tones (2×RU996), a decimal value in a range of 101~106 of the seven most significant bits indicates an entry in the RU allocation table corresponding to an aggregation of one RU of 484 tones (RU484) and two RUs each of 996 tones (2×RU996), a decimal value in a range of 107~110 of the seven most significant bits indicates an entry in the RU allocation table corresponding to an aggregation of three RUs each of 996 tones (3×RU996), and a decimal value in a range of 111~118 of the seven most significant bits indicates an entry in the RU allocation table corresponding to an aggregation of one RU of 484 tones (RU484) and three RUs each of 996 tones (3×RU996).

24. An apparatus, comprising:

a transceiver configured to communicate wirelessly; and a processor coupled to the transceiver and configured to perform operations comprising:

receiving, via the transceiver, a signaling;

determining allocation of single or multiple resource units (RUs) according to a 9-bit RU allocation subfield indicated in the signaling; and performing, via the transceiver, wireless communications using the single or multiple RUs, wherein:

a decimal value in a range of 0~68 of seven bits of the 9-bit RU allocation subfield indicates an entry in the RU allocation table corresponding to a single RU of 26-tones, 52-tones, 106-tones, 242-tones, 484-tones and 996-tones; or a decimal value larger than 68 of the seven bits of the 9-bit RU allocation subfield indicates another entry in the RU allocation table corresponding to a multi-RU (MRU) of (52+26)-tones, (106+26)-tones, (484+242)-tones, (996+484)-tones, (996+484+242)-tones, (2×996+484)-tones, (3×996+484)-tones, (2×996)-tones, (3×996)-tones and RU (4×996)-tones.

* * * * *